US012739635B2

(12) United States Patent
Wang et al.

(10) Patent No.: US 12,739,635 B2
(45) Date of Patent: Sep. 15, 2026

(54) APPLICATION-SPECIFIC GPSI RETRIEVAL

(71) Applicant: TELEFONAKTIEBOLAGET LM ERICSSON (PUBL), Stockholm (SE)

(72) Inventors: Cheng Wang, Shanghai (CN); Ferhat Karakoc, Istanbul (TR); Christine Jost, Dalby (SE); Vlasios Tsiatsis, Stockholm (SE); David Castellanos Zamora, Madrid (ES); Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 18/289,591

(22) PCT Filed: Apr. 8, 2022

(86) PCT No.: PCT/EP2022/059381
§ 371 (c)(1),
(2) Date: Nov. 6, 2023

(87) PCT Pub. No.: WO2022/233534
PCT Pub. Date: Nov. 10, 2022

(65) Prior Publication Data

US 2024/0276217 A1 Aug. 15, 2024

(30) Foreign Application Priority Data

May 6, 2021 (WO) ................ PCT/CN2021/098183

(51) Int. Cl.
*H04W 12/069* (2021.01)
*H04W 12/71* (2021.01)
*H04W 12/72* (2021.01)

(52) U.S. Cl.
CPC ......... *H04W 12/069* (2021.01); *H04W 12/71* (2021.01); *H04W 12/72* (2021.01)

(58) Field of Classification Search
CPC ... H04W 12/069; H04W 12/71; H04W 12/72; H04W 12/08; H04L 2209/80;
(Continued)

(56) References Cited

U.S. PATENT DOCUMENTS

2020/0359218 A1 11/2020 Lee et al.
2021/0058780 A1 2/2021 Yu
(Continued)

FOREIGN PATENT DOCUMENTS

KR 1020200134278 12/2020
WO 2019193129 A1 10/2019
(Continued)

OTHER PUBLICATIONS

ZTE et al., "Sending UE ID to the AKMA AF", 3GPP TSG-SA3 Meeting #105-e, S3-213941, e-meeting, Nov. 8-19, 2021.
(Continued)

*Primary Examiner* — Dhaval V Patel
(74) *Attorney, Agent, or Firm* — Murphy, Bilak & Homiller, PLLC

(57) ABSTRACT

A method for a user equipment (UE) configured to communicate with an application function (AF) via a communication network is provided. The method comprises sending, to the AF, an application service request including: a second identifier (GPSI) specific to one or more applications, including an application associated with the UE and the AF; and information (app-info) associated with the second identifier and descriptive of the one or more applications. The method further comprises authenticating the AF based on an application-specific key (KAF) derived from a security key (KAKMA) associated with the UE; and receiving, from the AF, an application service response indicating whether the
(Continued)

second identifier (GPSI) matches a corresponding second identifier (GPSI*) derived from the information associated with the second identifier.

29 Claims, 11 Drawing Sheets

(58) Field of Classification Search
CPC ... H04L 9/0836; H04L 9/0866; H04L 9/3271; H04L 63/0876
See application file for complete search history.

(56) References Cited

U.S. PATENT DOCUMENTS

| | | | | |
|---|---|---|---|---|
| 2021/0392495 | A1* | 12/2021 | Tsiatsis | H04W 12/40 |
| 2022/0124147 | A1* | 4/2022 | Ge | H04L 47/781 |
| 2022/0174063 | A1* | 6/2022 | Wu | H04L 9/0844 |
| 2022/0278835 | A1 | 9/2022 | Guo et al. | |
| 2022/0322067 | A1 | 10/2022 | Kim et al. | |
| 2022/0329648 | A1* | 10/2022 | De Foy | H04L 67/10 |
| 2022/0345888 | A1* | 10/2022 | Yu | H04L 9/083 |
| 2023/0019089 | A1 | 1/2023 | Li et al. | |
| 2023/0053805 | A1* | 2/2023 | Kim | H04L 67/63 |
| 2023/0068196 | A1* | 3/2023 | Sasi | H04L 9/0836 |

FOREIGN PATENT DOCUMENTS

| | | | |
|---|---|---|---|
| WO | 2020207156 | A1 | 10/2020 |
| WO | 2020226454 | A1 | 11/2020 |
| WO | 2020249861 | A1 | 12/2020 |
| WO | 2021031053 | A1 | 2/2021 |
| WO | 2021093163 | A1 | 5/2021 |
| WO | 2021093170 | A1 | 5/2021 |

OTHER PUBLICATIONS

3GPP TR 33.839 V0.5.0, "3rd Generation Partnership Project; Technical Specification Group Services and System Aspects; Study on Security Aspects of Enhancement of Support for Edge Computing in 5GC (Release 17)", TR 33.839 V0.5.0, Mar. 2021.
3GPP TS 23.558 V2.0.0, "3rd Generation Partnership Project; Technical Specification Group Services and System Aspects; Architecture for enabling Edge Applications; (Release 17)", TS 23.558 V2.0.0, Mar. 2021.
3GPP TS 33.501 V16.2.0, "3rd Generation Partnership Project; Technical Specification Group Services and System Aspects; Security architecture and procedures for 5G system (Release 16)", TS 33.501 V16.2.0, Mar. 2020.
3GPP TS 33.535 V17.1.0, "3rd Generation Partnership Project; Technical Specification Group Services and System Aspects; Authentication and Key Management for Applications (AKMA) based on 3GPP credentials in the 5G System (5GS) (Release 17)", TS 33.535 V17.1.0, Mar. 2021.
3GPP TR 33.839 V0.3.0, "3rd Generation Partnership Project; Technical Specification Group Services and System Aspects; Study on Security Aspects of Enhancement of Support for Edge Computing in 5GC (Release 17)", Nov. 2020.
3GPP TS 23.558 V1.2.0, "3rd Generation Partnership Project; Technical Specification Group Services and System Aspects; Architecture for enabling Edge Applications; (Release 17)", Nov. 2020.
3GPP TS 33.535 V17.2.1, "3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.2.1, Jun. 2021.
3GPP TS 33.535, "3rd Generation Partnership Project; Technical Specification Group Services and System Aspects; Authentication and Key Management for Applications (AKMA) based on 3GPP credentials in the 5G System (5GS) (Release 17)", V17.0.0, Dec. 2020, 20 pages.
3GPP, "3rd Generation Partnership Project; Technical Specification Group Core Network and Terminals; 5G System; Network Exposure Function Northbound APIs; Stage 3 (Release 17)", 3GPP TS 29.522 V17.0.0, Dec. 2020.
3GPP, "3rd Generation Partnership Project; Technical Specification Group Services and System Aspects; Architecture for enabling Edge Applications; (Release 17)", 3GPP TS 23.558 V17.0.0, Jun. 2021.
3GPP, "3rd Generation Partnership Project; Technical Specification Group Services and System Aspects; Study on Security Aspects of Enhancement of Support for Edge Computing in 5GC (Release 17)", 3GPP TR 33.839 V0.6.0, May 2021.
3GPP, "DAD at Start of Day 3 for CT3#113e Meeting", 3GPP TSG-CT WG3 Meeting #113e, C3-210005, E-Meeting, Jan. 25-29, 2021.
Qualcomm Incorporated, "Corrections and clarifications to AKMA procedures", 3GPP TSG-SA3 Meeting #100e, S3-202205, e-meeting, Aug. 17-28, 2020.
Qualcomm Incorporated, "Sending UE identifier to the AKMA AF", 3GPP TSG-SA3 Meeting #101-e, S3-203191, e-meeting, Nov. 9-20, 2020.

* cited by examiner

APPLICATION-SPECIFIC GPSI RETRIEVAL

PRIORITY CLAIM

This application is a national stage application of International Patent Application No. PCT/EP2022/059381, filed Apr. 8, 2022, which claims priority to International Patent Application No. PCT/CN2021/091853, May 6, 2021, the disclosure disclosures of which are hereby incorporated in their entirety by reference.

TECHNICAL FIELD

The present application relates generally to the field of wireless communication networks, and more specifically to improved techniques for authenticating a user equipment (UE) in a communication network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases.

3GPP security working group SA3 specified the security-related features for Release 15 (Rel-15) of the 5G System (5GS) in 3GPP TS 33.501 (v15.11.0). In particular, the 5GS includes many new features (e.g., as compared to earlier 4G/LTE systems) that required introduction of new security mechanisms. For example, 5GS seamlessly integrates non-3GPP access (e.g., via wireless LAN) together with 3GPP access (e.g., NR and/or LTE). As such, in 5GS, a user equipment (UE, e.g., wireless device) can access services independent of underlying radio access technology (RAT). 3GPP Rel-16 introduces a new feature called authentication and key management for applications (AKMA) that is based on 3GPP user credentials in 5G, including the Internet of Things (IoT) use case. More specifically, AKMA leverages the user's Authentication and Key Agreement (AKA) credentials to bootstrap security between the UE and an application function (AF), which allows the UE to securely exchange data with an application server. The AKMA architecture can be considered an evolution of Generic Bootstrapping Architecture (GBA) specified for 5GC in Rel-15 and is further specified in 3GPP TS 33.535 (v.16.2.0).

As further defined in 3GPP TS 33.535, the network and the UE derive an $K_{AKMA}$ key and an associated A-KID, as well as a $K_{AF}$ key. $K_{AF}$ is used to support of the security of the communication between the UE and an Application Function (AF), and A-KID is AKMA Key IDentifier of the root key (i.e., $K_{AKMA}$) that is used to derive $K_{AF}$. More specifically, A-KID includes an AKMA Temporary UE Identifier (A-TID) and routing information related to the UE's home network (HPLMN).

The 3GPP Rel-17 study on "Security Aspects of Enhancement of Support for Edge Computing in 5GC" includes requirements for authentication of UE identities to Edge Computing Servers. 3GPP TS 23.558 (v1.2.0) specifies different interactions between Edge Enabler Client (EEC) and Edge Enabler Server (EES) or Edge Configuration Server (ECS) that use a UE ID for identifying the UE. The UE ID is specified in 3GPP TS 23.558 section 7.2.6, with the only example being a generic public subscription identifier (GPSI).

The EEC, which runs on the UE, needs to authenticate the GPSI of the UE towards the EES and/or ECS. One possible solution is the usage of AKMA, discussed above. However, there are cases where multiple GPSIs can be stored by the network in association with a single UE subscription. For example, each of GPSIs may be associated with specific services and/or applications. This can cause various problems, issues, and/or difficulties for authentication of the UE.

SUMMARY

Accordingly, exemplary embodiments of the present disclosure address these and other problems, issues, and/or difficulties associated with authenticating a UE for an application session, thereby facilitating the otherwise-advantageous deployment of Edge Computing for 5G.

Some embodiments of the present disclosure include exemplary methods (e.g., procedures) for a UE configured to communicate with an application function (AF) via a communication network.

These exemplary methods can include sending, to the AF, an application service request including a second identifier (GPSI) specific to one or more applications, including an application associated with the UE and the AF, as well as information (app-info) associated with the second identifier and descriptive of the one or more applications. These exemplary methods can also include authenticating the AF based on an application-specific key ($K_{AF}$) derived from a security key ($K_{AKMA}$) associated with the UE. These exemplary methods can also include receiving, from the AF, an application service response indicating whether the second identifier (GPSI) matches a corresponding second identifier (GPSI*) derived from the information associated with the second identifier.

In some embodiments, the application service request also includes a first identifier (A-KID) of the security key ($K_{AKMA}$) associated with the UE. In other embodiments, these exemplary methods can also include receiving a security challenge from the AF in response to the application service request and sending, to the AF in response to the security challenge, a first identifier (A-KID) of the security key ($K_{AKMA}$) associated with the UE.

In some embodiments, the AF comprises one or more of the following servers in an Edge Data Network (EDN) coupled to the communication network: Edge Enabler Server (EES), Edge Application Server (EAS), Edge Configuration Server (ECS). In such embodiments, the method can be performed by a user client, of the UE, that is configured to communicate with the one or more servers comprising the AF.

Other embodiments of the present disclosure include exemplary methods (e.g., procedures) for an application function (AF) associated with a communication network. These exemplary methods can be performed by any appropriate type of AF.

These exemplary methods can include obtaining the following information:

a trusted temporary identifier related to an application associated with the AF and with a user equipment (UE) configured to communicate with the AF, and information (app-info) descriptive of the one or more applications, including the application associated with the UE and the AF;

These exemplary methods can also include sending, to a network function (NF) of the communication network, a request for a corresponding second identifier (GPSI*) specific to the application associated with the UE and with the AF. The request includes the information descriptive of the one or more applications. These exemplary methods can also include receiving the corresponding second identifier from the NF.

In some embodiments, the trusted temporary identifier is a second identifier (GPSI) specific to one or more applications, including the application associated with the UE and the AF. In such embodiments, the trusted temporary identifier is received in an application service request from the UE.

In some of these embodiments, the information descriptive of the one or more applications can also be received in the application service request, or the information descriptive of the one or more applications can be determined based on the trusted temporary identifier (e.g., GPSI) received in the application service request.

In some of these embodiments, the request for the corresponding second identifier comprises an AKMA request message that also includes a first identifier (A-KID) of a security key ($K_{AKMA}$) associated with the UE. In such embodiments, the corresponding second identifier (GPSI*) is received from the NF, in response to the AKMA request message, together with an application-specific key ($K_{AF}$) associated with the UE and the AF.

In some of these embodiments, these exemplary methods can also include: authenticating the UE based on the application-specific key ($K_{AF}$); determining whether the second identifier (GPSI) received in the application service request from the UE matches the corresponding second identifier (GPSI*) received from the NF; and sending, to the UE, an application service response indicating whether the second identifier (GPSI) matches the corresponding second identifier (GPSI*).

In some embodiments, the second identifier is a generic public subscription identifier, GPSI.

In other embodiments, the trusted temporary identifier is a UE Internet Protocol (IP) address for a connection between the UE and the AF and is obtained by a connection layer or a network layer of the AF. In some of these embodiments, the information descriptive of the one or more applications can be received from the UE via the connection or can be determined based on local policy associated with the AF.

In some embodiments, the AF comprises one or more of the following servers in an Edge Data Network (EDN) coupled to the communication network: Edge Enabler Server (EES), Edge Application Server (EAS), Edge Configuration Server (ECS). In such embodiments, the one or more servers comprising the AF are configured to communicate with a user client of the UE.

Other embodiments include exemplary methods (e.g., procedures) for a network function (NF) of a communication network.

These exemplary methods can include receiving, from an application function (AF) associated with the communication network, a request for a corresponding second identifier (GPSI*) specific to an application associated with the UE and with the AF. The request includes information descriptive of one or more applications, including the application associated with the UE and with the AF. These exemplary methods can also include obtaining the corresponding second identifier (GPSI*) based on the information descriptive of the one or more applications. These exemplary methods can also include sending the corresponding second identifier (GPSI*) to the AF.

In some embodiments, obtaining the corresponding second identifier (GPSI*) can include obtaining a subscription permanent identifier (SUPI) associated with the UE; sending the SUPI to a unified data management (UDM) function of the communication network; and receiving the corresponding second identifier (GPSI*) from the UDM.

In some of these embodiments, the SUPI is sent to the UDM together with the information descriptive of the one or more applications. In other of these embodiments, the corresponding second identifier (GPSI*) is one of a plurality of identifiers received from the UDM together with associated descriptive information. In such embodiments, these exemplary methods can also include selecting the corresponding second identifier (GPSI*) from the plurality of identifiers based on a match between the information descriptive of the one or more applications and an entry in the associated descriptive information.

In other embodiments, obtaining the corresponding second identifier (GPSI*) can include retrieving the corresponding second identifier (GPSI*) from local storage.

In some embodiments, the request for the corresponding second identifier comprises an AKMA request message that also includes a first identifier (A-KID) of a security key ($K_{AKMA}$) associated with the UE. In such embodiments, these exemplary methods can also include deriving the application-specific key ($K_{AF}$) based on the first identifier and determining whether the AF is authorized to obtain the corresponding second identifier (GPSI*) based on the information descriptive of the one or more applications. In some of these embodiments, the corresponding second identifier (GPSI*) is sent to the AF in an AKMA response message together with an application-specific key ($K_{AF}$) associated with the UE and the AF, based on a determination that the AF is authorized.

In other embodiments, the request for the corresponding second identifier comprises a translation request that also includes a UE Internet Protocol (IP) address for a connection between the UE and the AF. In such embodiments, the subscription permanent identifier (SUPI) is obtained based on the UE IP address.

In some embodiments, the NF is a network exposure function (NF) or an anchor function for authentication and key management for applications (AAnF), and the AF comprises one or more of the following servers in an Edge Data Network (EDN) coupled to the communication network: EES, EAS, and ECS.

Other embodiments include exemplary methods (e.g., procedures) for a unified data management (UDM) function of a communication network.

These exemplary methods can include receiving, from a network function (NF) of the communication network, a subscription permanent identifier (SUPI) associated with a user equipment (UE). These exemplary methods can also include, based on the SUPI, determining a corresponding second identifier (GPSI*) specific to an application associated with the UE and with an application function (AF). These exemplary methods can also include sending the corresponding second identifier (GPSI*) to the NF.

In some embodiments, determining the corresponding second identifier (GPSI*) is further based on information descriptive of one or more applications, including the application associated with the UE and with the AF. In such case, the information descriptive of the one or more applications is received from the NF together with the SUPI.

In other embodiments, the corresponding second identifier (GPSI*) is one of a plurality of identifiers determined based on the SUPI and the plurality of identifiers are sent to the NF together with associated information descriptive of applications.

In some embodiments, the NF is a network exposure function (NF) or an anchor function for authentication and key management for applications (AAnF).

Other embodiments include UEs, AFs, NFs, and UDMs (or network nodes hosting the same) that are configured to perform the operations corresponding to any of the exemplary methods described herein. Other embodiments include non-transitory, computer-readable media storing computer-executable instructions that, when executed by processing circuitry, configure such UEs, AFs, NFs, and UDMs to perform operations corresponding to any of the exemplary methods described herein.

These and other embodiments described herein can facilitate use of application-specific GPSIs for authentication, which is consistent with the needs associated with the increased use of a variety of Edge Computing (EC) applications with 3GPP networks.

These and other objects, features, and advantages of the present disclosure will become apparent upon reading the following Detailed Description in view of the Drawings briefly described below.

DETAILED DESCRIPTION

Figure 1:
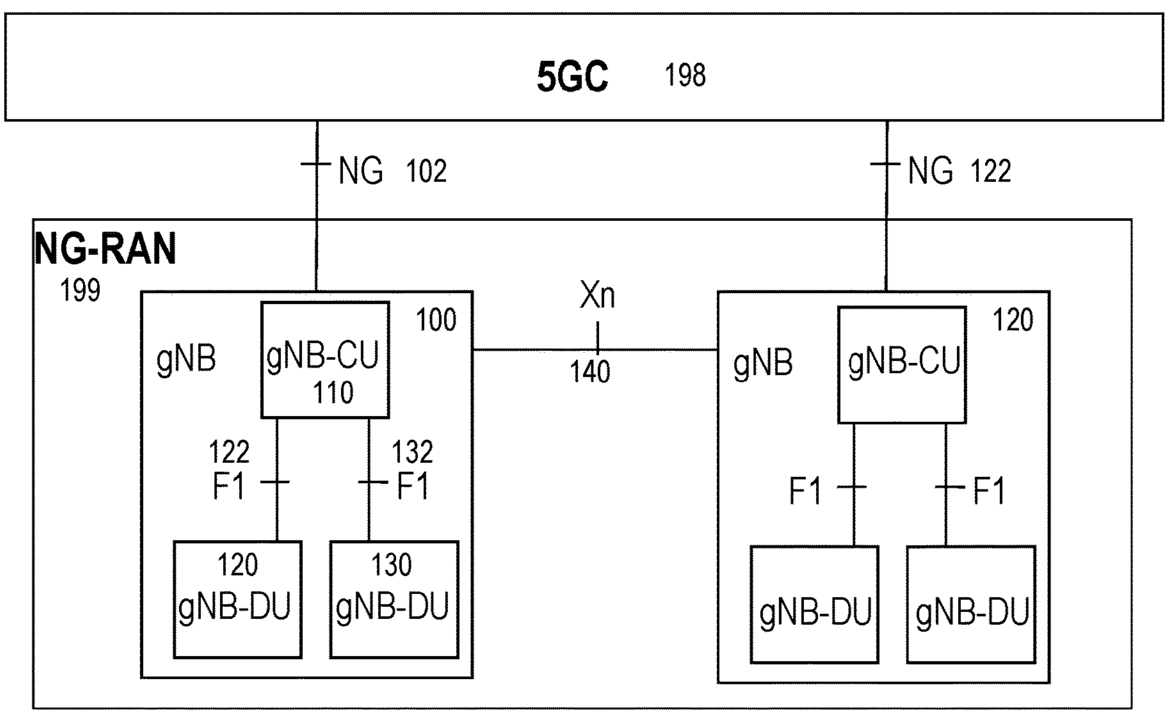
FIGS. 1-2 illustrate various aspects of an exemplary 5G network architecture.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol. Security for the communications over this these strata is provided by the NAS protocol (for NAS) and PDCP (for AS).

FIG. 1 illustrates a high-level view of an exemplary 5G network architecture, consisting of a Next Generation RAN (NG-RAN) 199 and a 5G Core (5GC) 198. NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0) shall be applied.

The NG RAN logical nodes shown in FIG. 1 (and described in 3GPP TS 38.401 (v15.6.0) and 3GPP TR 38.801 (v14.0.0) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5GS (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

The services in 5GC can be stateless, such that the business logic and data context are separated. For example, the services can store their context externally in a proprietary database. This can facilitate various cloud infrastructure features like auto-scaling or auto-healing. Furthermore, 5GC services can be composed of various "service operations", which are more granular divisions of overall service functionality. The interactions between service consumers and producers can be of the type "request/response" or "subscribe/notify".

Figure 2:
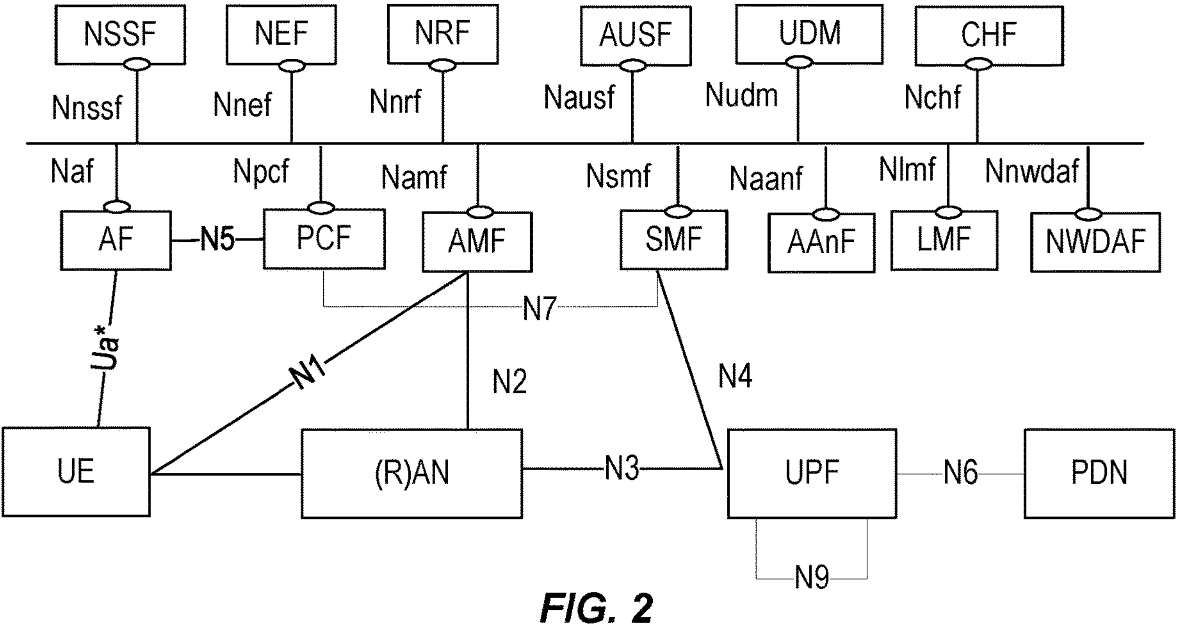

FIG. 2 shows an exemplary non-roaming 5G reference architecture with service-based interfaces and various 3GPP-defined NFs within the Control Plane (CP). These include the following NFs, with additional details provided for those most relevant to the present disclosure:

- Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.
- Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.
- User Plane Function (UPF)— supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.
- Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.
- Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.
- Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point.
- Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.
- Network Repository Function (NRF) with Nnrf interface—provides service registration and discovery, enabling NFs to identify appropriate services available from other NFs.
- Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice.

The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF) with Nnwdaf interface—provides network analytics information (e.g., statistical information of past events and/or predictive information) to other NFs on a network slice instance level.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

Figures 3, 4:
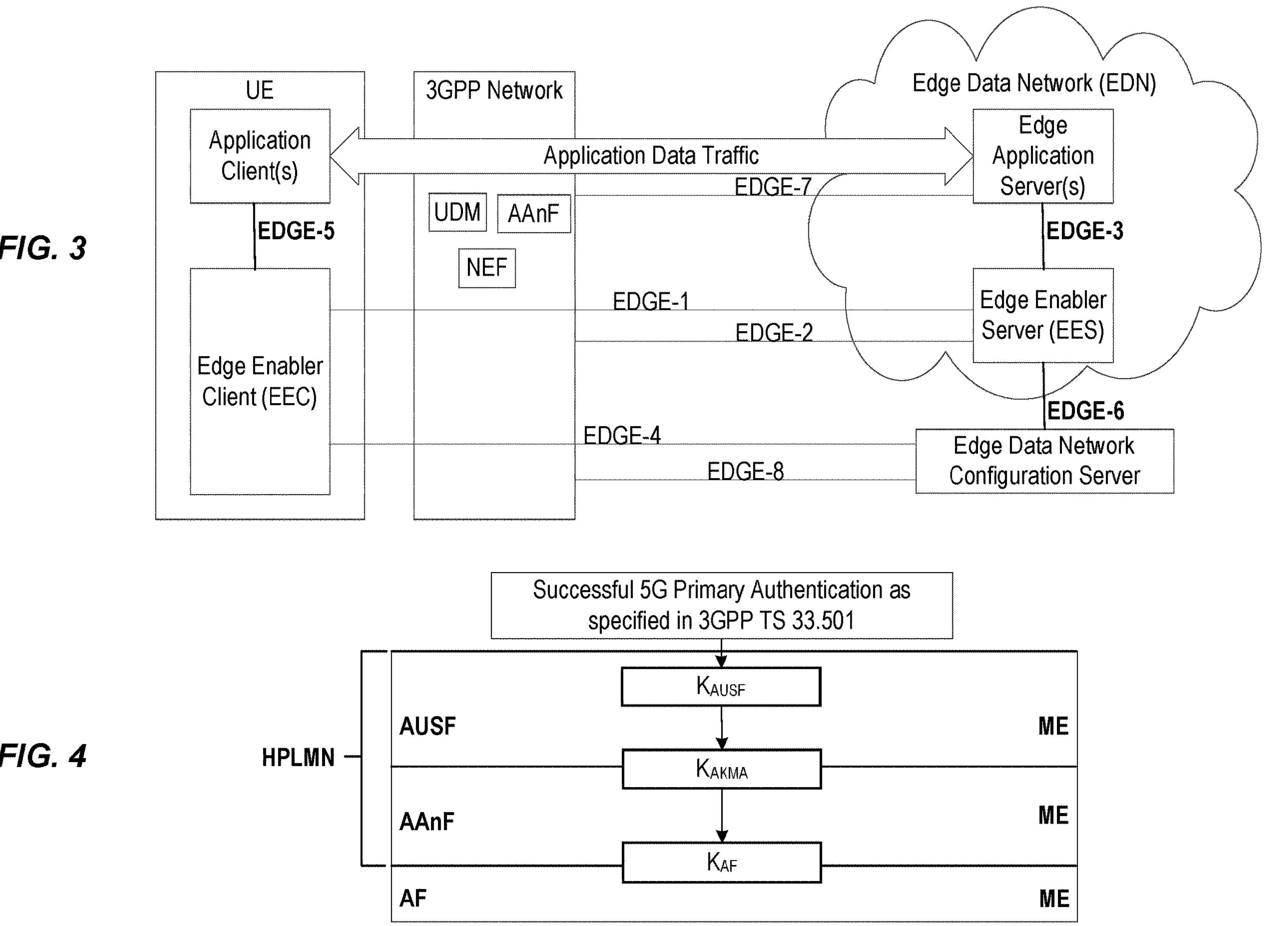
FIG. 3 shows an exemplary hierarchy of security keys in a 5G network.
FIG. 4 shows a signal flow diagram of an exemplary key generation procedure.

FIG. 3 shows a high-level architecture for Edge Computing (EC) integration with 3GPP networks, such as the 5GC discussed above. In particular, a UE can include one or more application clients and an Edge Enabler Client (EEC). The EEC communications with a corresponding Edge Enabler Server (EES) in the Edge Data Network (EDN) via an EDGE-1 interface, and with a corresponding Edge Configuration Server (ECE) via an EDGE-4 interface. Each application client sends and receives application data traffic with a corresponding Edge Application Server (EAS) in the EDN. All of these communications are via the 3GPP network, e.g., NG-RAN and 5GC. In general, the application client(s) and EEC can be considered as an "end user" and/or "user client", and such terms may be used in the following description.

5GC functions involved with interaction towards the EDN include UDM, NEF, and AAnF. The 3GPP network communicates with the EAS via an EDGE-7 interface, with the EES via an EDGE-2 interface, and with the ECS via an EDGE-8 interface. Communications between EES and ECS occur via an EDGE-6 interface, while communications between EAS and EES occur via an EDGE-3 interface. In general, the EAS, EES, and ECS can be considered as an "application server", "EC server", or an "application function" (or AF, for short), and such terms may be used in the following description. These can be deployed by various entities but, as shown in FIG. 4, are outside of the 3GPP network. However, other AFs may be deployed by mobile network operators (MNOs) inside of the MNO's 3GPP network.

As mentioned above, 3GPP Rel-16 introduces a new AKMA feature that is based on 3GPP user credentials in 5G, including the IoT use case. More specifically, AKMA leverages the user's AKA credentials to bootstrap security between the UE and an AF, which allows the UE to securely exchange data with an application server. The AKMA architecture can be considered an evolution of Generic Bootstrapping Architecture (GBA) specified for 5GC in Rel-15 and is further specified in 3GPP TS 33.535 (v.16.2.0).

In addition to the NEF, AUSF, and AF shown in FIG. 2 and described above, AKMA also utilizes an anchor function for authentication and key management for applications (AAnF). This function is shown in FIG. 2 with Naanf interface. In general, AAnF interacts with AUSFs and maintains UE AKMA contexts to be used for subsequent bootstrapping requests, e.g., by application functions. At a high level, AAnF is similar to a bootstrapping server function (BSF) defined for Rel-15 GBA.

In general, AKMA reuses the result of 5G primary authentication procedure used to authenticate a UE during network registration (also referred to as "implicit bootstrapping"). In this procedure, AUSF is responsible of generation and storage of key material. In particular, the key hierarchy in AKMA includes the following, which is further illustrated in FIG. 3:

$K_{AUSF}$: root key, output of primary authentication procedure and stored in UE (i.e., mobile equipment, ME, part) and AUSF. Additionally, AUSF can report the result and the particular AUSF instance that generates $K_{AUSF}$ as output of the primary authentication result in UDM, as defined in 3GPP TS 33.501.

$K_{AKMA}$: anchor key derived by ME and AUSF from $K_{AUSF}$ and used by AAnF for further AKMA key material generation. The key identifier A-KID is the AKMA Key IDentifier of $K_{AKMA}$. A-KID includes an AKMA Temporary UE Identifier (A-TID) and routing information related to the UE's home network (HPLMN).

$K_{AF}$: application key derived by ME and AAnF from $K_{AK}$MA and used by UE and the Application to securely exchange application data.

When the UE wants to use AKMA, it constructs $K_{AF}$ and A-KID and sends A-KID to the AF, which can be located in or outside of the operator's network. The AF requests the $K_{AF}$ associated with the A-KID from the AAnF by sending the A-KID to the AAnF via NEF when the AF is located outside the operator's network or directly when the AF is located inside the operator's network. After the authentication of the AF by the operator network, the AAnF sends the corresponding $K_{AF}$ to the AF, possibly via NEF. Thereby the shared key material $K_{AF}$ is available in UE and AF to support the security of the communication between them.

The 3GPP Rel-17 study on "Security Aspects of Enhancement of Support for Edge Computing in 5GC" includes requirements for authentication of UE identities to Edge Computing Servers. 3GPP TS 23.558 (v1.2.0) specifies different interactions between Edge Enabler Client (EEC) and Edge Enabler Server (EES) or Edge Configuration Server (ECS) that use a UE ID for identifying the UE. The UE ID is specified in 3GPP TS 23.558 section 7.2.6, with the only example being a generic public subscription identifier (GPSI).

Figure 5:
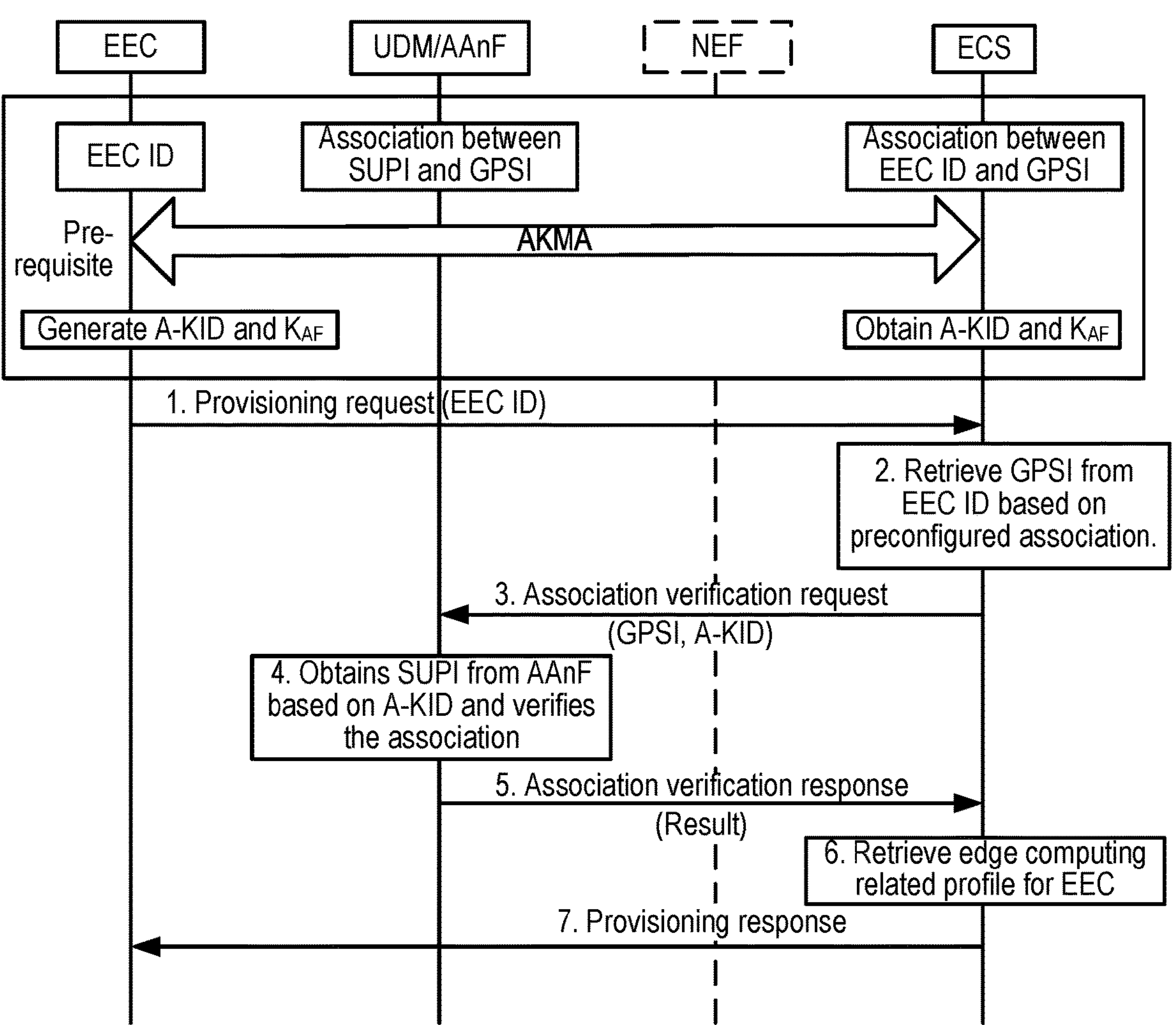
FIG. 5 shows a signal flow diagram of an exemplary authentication/authorization procedure between an Edge Enabler Client (EEC) and an Edge Configuration Server (ECS) in a 5G network.

The EES/ECS needs to authenticate the GPSI of the UE, which is provided by the EEC that runs on the UE. One possible solution is AKMA, such as described in 3GPP TR 33.839 (v0.3.0). FIG. 5 shows a signal flow diagram of an exemplary authentication/authorization procedure between an EEC and an ECS. In addition, the procedure shown in FIG. 5 involves a UDM/AAnF and an NEF. Although some of the operations shown in FIG. 5 are given numerical labels, these are meant to facilitate explanation and do not imply any strict temporal order of the operations, unless specifically noted otherwise.

Preconditions of the numbered operations are shown in the rectangle and include the following:

- EEC and ECS have shared A-KID and $K_{AF}$ via AKMA (as specified in 3GPP TS 33.535).
- ECS or 5GC is configured with the edge computing related profile for EEC.
- ECS and 5GC share a UE identifier (i.e., GPSI) to identify EEC.
- ECS stores an association between EEC ID and UE identifier. This association is preconfigured in ECS by the ECS administrator.

In operation 1, the UE initiates the service provisioning procedure with EEC ID included (as further specified in 3GPP TS 23.558 section 8.3). In operation 2, ECS retrieves GPSI based on the preconfigured association with EEC ID. In operation 3, in order to prove the authenticity of the UE's GPSI, ECS sends an association check request to UDM, including the GPSI and A-KID. If ECS is located outside of 5GC, the request should be sent via NEF. In operation 4, in order to verify the association of GPSI and A-KID, UDM first contacts AUSF to obtain the corresponding SUPI of the A-KID. Afterwards, UDM verifies the association of the GPSI and A-KID based on the association between SUPI and GPSI.

In operation 5, UDM sends the association verification response back to ECS. In operation 6, upon successful verification, ECS retrieves the edge computing related profile for EEC from 5GC or from its local database. Afterwards, ECS can determine EEC's authorization based on EEC's profile. In operation 7, ECS sends a provisioning response to EEC.

In the current AKMA solution, discussed above, AAnF only returns to the AF a $K_{AF}$ corresponding to the received A-KID. The AF cannot authenticate the identity of the UE based on A-KID associated with $K_{AF}$, but rather requires an authentic permanent identifier to do so.

Alternately, GPSI can be used as a user identifier for interactions between EEC and EES/ECS. In such scenarios, GPSI also requires authentication. After completing the same preconditions as described above, the EEC sends GPSI to ECS/EES in the provisioning request. To verify the received GPSI, the EES/ECS sends the A-KID and the GPSI to the AAnF via NEF or directly depending on the location of EEC/ECS. Subsequently, the AAnF fetches the GPSI from the UDM based on the SUPI which is a part of AKMA context identified by the A-KID in the AAnF. The AAnF checks whether the GPSI sent by the EEC and the GPSI received from the UDM are same or not. If the check is successful, the AAnF provides validated result to the EES/ECS. Otherwise AAnF sends a failure message.

There are cases where multiple GPSIs can be stored by the network in association with a single UE subscription. For example, user subscription data stored in the UDM can include the SUPI and a list of GPSIs, each associated with a different service and/or application. For EC scenarios defined in 3GPP TS 23.558, an application GPSI from UE subscription can be specifically assigned and only used within a specific application (e.g., video, gaming), service (Amazon EES, Azure ECS), or specific service provider (e.g., ECSP). Alternatively, in the context of AKMA, the list of public IDs per application can be defined within a set of AKMA User Security Settings (AUSS) similar to the GBA User Security Settings (GUSS).

When a user client invokes a service request towards a particular AF and presents an application-specific GPSI, user authentication is triggered based on the application-specific GPSI. However, it is currently unclear how the AF can retrieve a corresponding application-specific GPSI from the 3GPP network (e.g., 5GC) so that it can cross-check/authenticate the GPSI presented by the user client.

Embodiments of the present disclosure address these and other problems, issues, and/or difficulties by providing novel, flexible, and efficient techniques whereby application-specific information (also referred to as "application information" or "app-info") is stored in the 3GPP network (e.g., UDM) in association with the respective application-specific GPSIs. The application-specific information can indicate and/or represent services or applications for which the corresponding GPSI is used. The application-specific information should be mutually agreed between the MNO and the external application service providers associated with the respective GPSIs.

When a user client invokes a service with an application server and presents an application-specific GPSI for user authentication, the user client also provides the associated application-specific information, if available, to enable the application server to understand the context in which the application-specific GPSI is used. When application server tries to authenticate the user client based on the application-specific GPSI, the application server requests a corresponding application-specific GPSI from the 3GPP network based on presenting the received application-specific information as input. The 3GPP network uses the received application-specific information to obtain and return the corresponding application-specific GPSI, and/or authorizes the application server to obtain the corresponding application-specific GPSI itself.

Embodiments disclosed herein can provide various benefits and/or advantages. For example, embodiments can improve AKMA-type procedures to make UE authentication possible for AFs while having low and/or minimal complexity to existing AKMA-type procedures. As another example, embodiments can facilitate use of application-specific GPSIs for authentication, which is consistent with the needs associated with the increased use of a variety of EC applications with 3GPP networks.

In various embodiments, the app-info can be any of the following:

- Application ID or name, e.g., "netflix"
- Application server ID or name, or application server type, e.g., "EES"
- Service provider ID or name, e.g., ECSP ID, ASP ID, ASP name.
- Service type label, e.g., "edge computing service"
- Wildcard (e.g., "*") indicating association with several services or applications.

As a more specific example, the UDM can store the following list of GPSIs and associated application-specific information for a user:

| GPSI | App-info |
|---|---|
| user1@netflix.mno.com | "netflix" |
| user2@tiktok.mno.com | "tiktok" |
| user0@ees.amz.mno.com | "ees.amz" |
| user8@ecs.azure.mno.com | "ecs.azure" |
| user6@ecsite1.cloudinfra.com | "ecsite1.cloudinfra", "netflix", "ees.amz", "*" |

Various embodiments are described in more detail below, using various figures for illustration. Although some of the operations shown in these figures are given numerical labels, these labels are meant to facilitate explanation and do not imply any strict temporal order of the operations, unless specifically noted otherwise.

Figure 6:
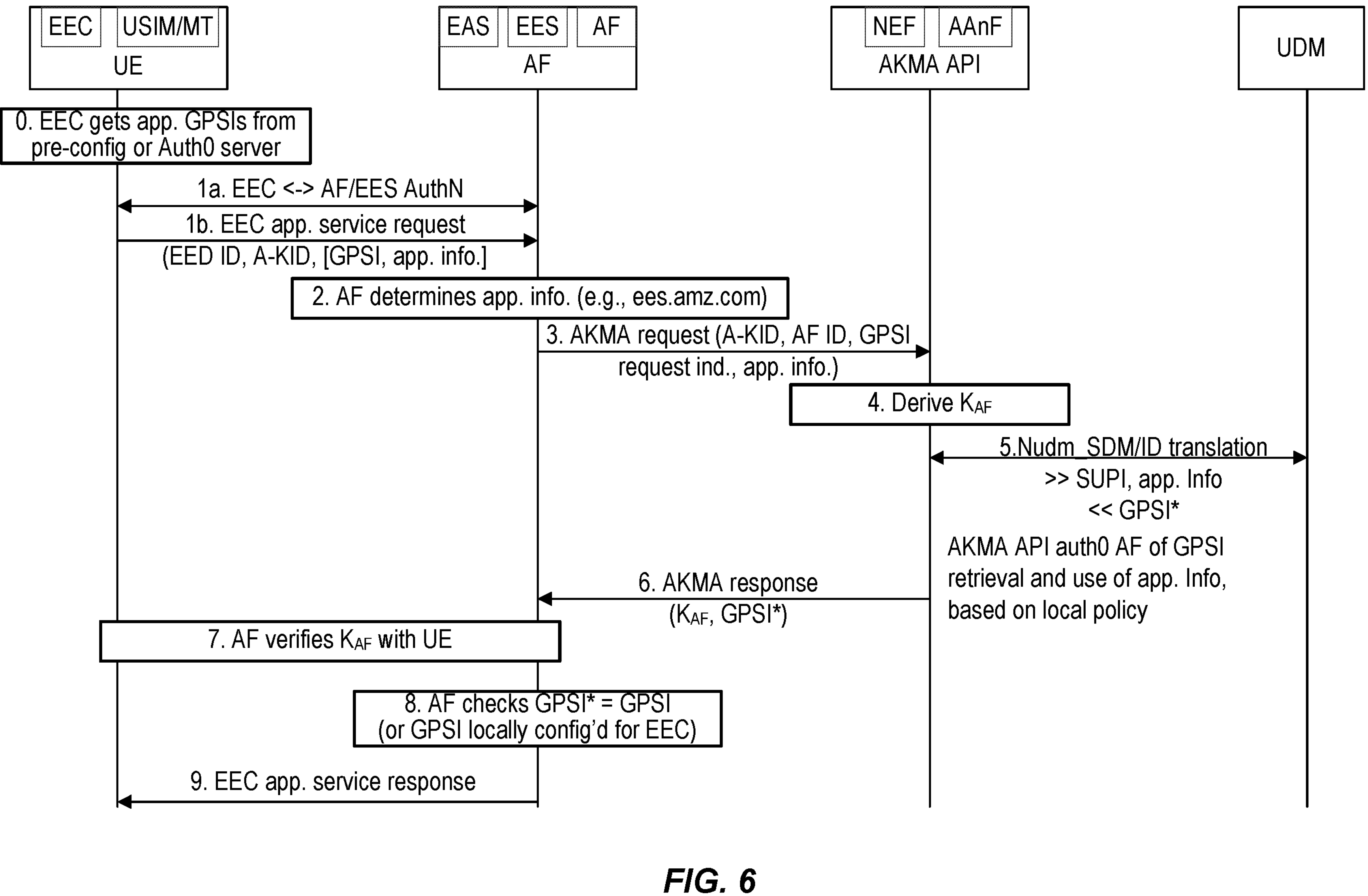
FIG. 6 shows a signal flow diagram of an exemplary procedure in which application-specific GPSI is used for UE-triggered user client authentication, according to various embodiments of the present disclosure.

FIG. 6 shows a signal flow diagram of an exemplary procedure in which application-specific GPSI is used for UE-triggered user client authentication, according to some embodiments of the present disclosure. Since this exemplary procedure uses A-KID as a trusted temporary UE ID input, the AKMA procedure defined in 3GPP TS 33.535 (v) is a prerequisite.

In operation 0, as a pre-requisite before communication between the user client and the AF, the EEC obtains an application-specific GPSI from local configuration or a third-party authorization server ("Auth0" in FIG. 6). In operation 1a, the user client performs client specific authentication procedure with the AF. In operation 1b, the user client invokes an application service request towards the AF, which collectively refers to EES, ECS, and EAS. In the application service request, the user client presents EEC ID, A-KID, the application-specific GPSI, and also the app-info associated with the application specific GPSI. In general, it is expected that the UE authenticates the user client to ensure EEC ID is authentic and that the user client is authorized to use AKMA capability (A-KID, Kaf etc.), the application-specific GPSI of the end user, and the associated app-info.

Additionally, operation 1b may include sub-operations if the user client does not know to use AKMA for the service request initially, e.g., as defined in 3GPP TS 33.535 clause 6.5. First, the user client presents EEC ID, the application-specific GPSI of the end user, and the associated app-info. The AF decides to challenge the user client with AKMA procedure, e.g., based on receiving the GPSI from the user client and/or the application being invoked. In response, the user client presents A-KID.

In operation 2, the AF receives the application service request from the user client and determines there is a need to authenticate the UE ID (i.e., the application-specific GPSI present by the user client. The AF may also determine the app-info if it is not received in the application service request. For example, the AF can determine the app-info based on the application-specific GPSI presented by the user client (e.g., realm part of GPSI may provide hints). Alternately, the AF can determine the app-info based on local configuration and policy.

In operation 3, the AF sends an AKMA request message towards the AKMA API provided by the network (e.g., NEF or AAnF). This message can include the A-KID, an AF ID (e.g., of the AF), a GPSI request indicator, and the app-info. Alternatively, if the list of GPSIs per application is included within the AUSS, the AF may not need to include the GPSI request indicator and the app-info in the AKMA request, since the AAnF will fetch the AUSS from UDM as part of the AKMA procedure.

FIG. 6 shows the AKMA provided by NEF and AAnF. More specifically, if the AF is internal to the 3GPP network, the AKMA API is provided by AAnF and the AKMA request message is aanf_AKMA_ApplicationKey_Get request. Alternately, if the AF is external to the 3GPP network, the AKMA API is provided by AAnF via NEF and the AKMA request message is passed through Nnef AKMA_AFKey_Get request and Naanf_AKMA_ApplicationKey_Get request.

In operation 4, the AAnF performs various AKMA operations and/or logic to derive the AKMA Application Key ($K_{AF}$). The AAnF checks that the AF is entitled to use the app-info to get the application specific GPSI, based on local policy. If AKMA API is provided via NEF, the NEF shall authorize the AF in the same way.

If the application specific GPSI is not (yet) locally available in the AAnF, the AAnF can use its locally stored SUPI to fetch the application specific GPSI from another NF. More specifically, the AAnF performs an Nudm_SDM/ID translation service operation with the UDM in operation 5. In this operation, the AAnF sends the UDM the SUPI and the appl. Info. The UDM uses the received information to locate the corresponding application specific GPSI (called "GPSI*") stored in the user's subscription data, such as discussed above. The UDM sends the retrieved GPSI* back to the AAnF.

Alternatively, if no app-info is provided to the UDM by the AAnF/NEF, the UDM may provide the complete list of corresponding GPSIs and the associated app-info stored in the user's subscription, based on the received SUPI. For example, if AUSS is supported in the AKMA procedure, the AAnF could fetch AUSS associated with the SUPI if not already done previously. The AAnF would then use the app-info provided by the AF to locate GPSI* from the list of GPSIs received from UDM. In some embodiments, the AAnF can retrain/store the complete list of GPSIs received from UDM and save this table locally for future use with other AFs.

In operation 6, the AAnF sends KAF derived in operation 4 and GPSI* obtained in operation 5 to the AF. The message can be passed through via NEF as needed, as discussed above in relation to operation 3. In operation 7, the AF performs various AKMA operations and/or logic to verify the KA towards the user client. In operation 8, the AF checks whether GPSI received from the user client in operation 1b matches GPSI* received in operation 6. In operation 9, the AF sends application service response to the user client according to the result from operation 8.

As an alternative to the operations shown in FIG. 6, the AF can verify the application specific GPSI with the network via AKMA API. This alternative includes two primary differences with respect to the operations shown in FIG. 6. First, in operation 3, the AF also sends the application specific GPSI to the AKMA API. In operation 6, instead of sending GPSI* back the AF, the AAnF verifies whether the application specific GPSI received from the AF in operation 3 matches GPSI* received in operation 5. If validation fails, the AAnF sends AKMA response to the AF with an appropriate error code.

Additionally, there can be use cases and/or scenarios in which an AF needs to retrieve an application specific GPSI from the 3GPP network for other purposes. For example, if the user invokes an application in different places and/or via different IP addresses, the AF may need to link user account information to the user client. More generally, the scenarios illustrated by FIG. 6 are UE-triggered while other scenarios may be AF-triggered.

Figure 7:
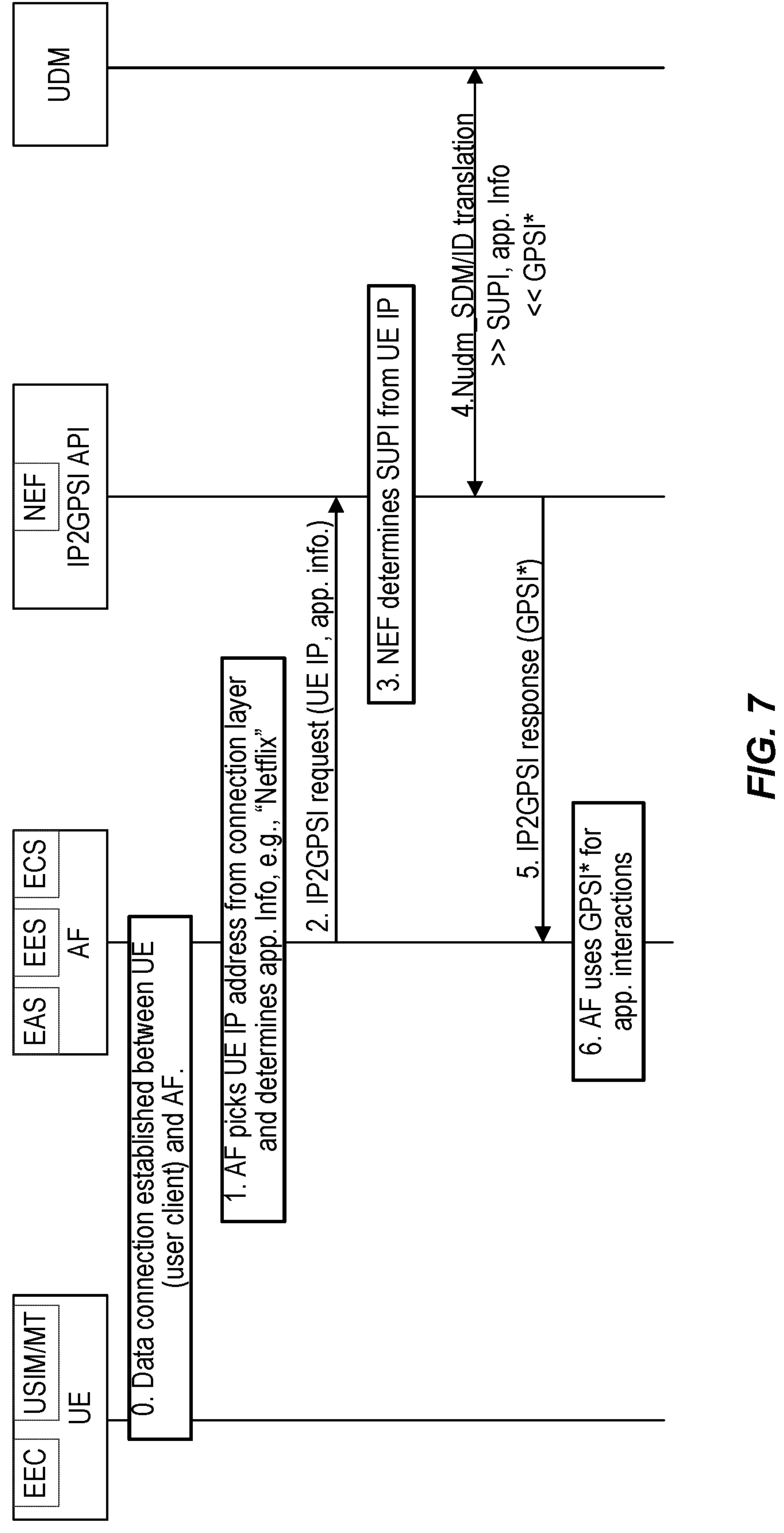
FIG. 7 shows a signal flow diagram of an exemplary procedure for an application function (AF) to request application-specific GPSI, according to some embodiments of the present disclosure.

FIG. 7 shows a signal flow diagram of an exemplary procedure used by an AF to request application-specific GPSI, according to some embodiments of the present disclosure. In these embodiments, the AF uses the UE's IP address, by which the end user is connected to the AF, as input to retrieve the application specific GPSI from the 3GPP network. In his case, the UE's IP address is treated as a trusted temporary UE ID, while the GPSI plays that role in the embodiments illustrated by FIG. 6. Also, the NEF is assumed to provide an API called "IP2GPSI" or a similar name. Even so, since the AF is assumed to be outside of the 3GPP network, this API could be provided by another AF in the 3GPP network but accessed via NEF as discussed above.

As a pre-requisite operation 0, there is a data connection established by the UE (i.e., user client) and the AF, with the UE having an assigned IP address for this connection. In operation 1, the AF determines a need to retrieve the application specific GPSI from the network. The AF obtains the UE's IP address from the IP layer connection (e.g., destination IP address). The AF determines the app-info based on local configuration and policy (e.g., if the AF is for Netflix service, the app-info is "netflix") or based on information provided by the user client.

In operation 2, the AF sends IP2GPSI service request towards the IP2GPSI API in 3GPP network (e.g., provided by NEF), with the service request including the determined IP address and app-info. In operation 3, the NEF authorizes the AF to use the app-info to get the application specific GPSI, based on local policy. If the application specific GPSI is not locally available in the NEF, the NEF locates the end user SUPI based on the received UE IP address and then uses the SUPI to fetch the application specific GPSI from another NF, e.g., UDM via Nudm Identifier Translation service operation.

Operation 4 is substantially the same as operation 5 in FIG. 6, described above. In operation 5, the IP2GPSI API returns GPSI* the AF, which uses it to interact with the user client and/or other AFs.

The embodiments described above can be further illustrated with reference to FIGS. 8-11, which depict exemplary methods (e.g., procedures) for a UE, an AF, an NEF or AAnF, and a UDM, respectively. Put differently, various features of the operations described below correspond to various embodiments described above. The exemplary methods shown in FIGS. 8-11 can be complementary to each other such that they can be used cooperatively to provide benefits, advantages, and/or solutions to problems described herein. Although the exemplary methods are illustrated in FIGS. 8-11 by specific blocks in particular orders, the operations corresponding to the blocks can be performed in different orders than shown and can be combined and/or divided into operations having different functionality than shown. Optional blocks and/or operations are indicated by dashed lines.

Figures 8, 9:
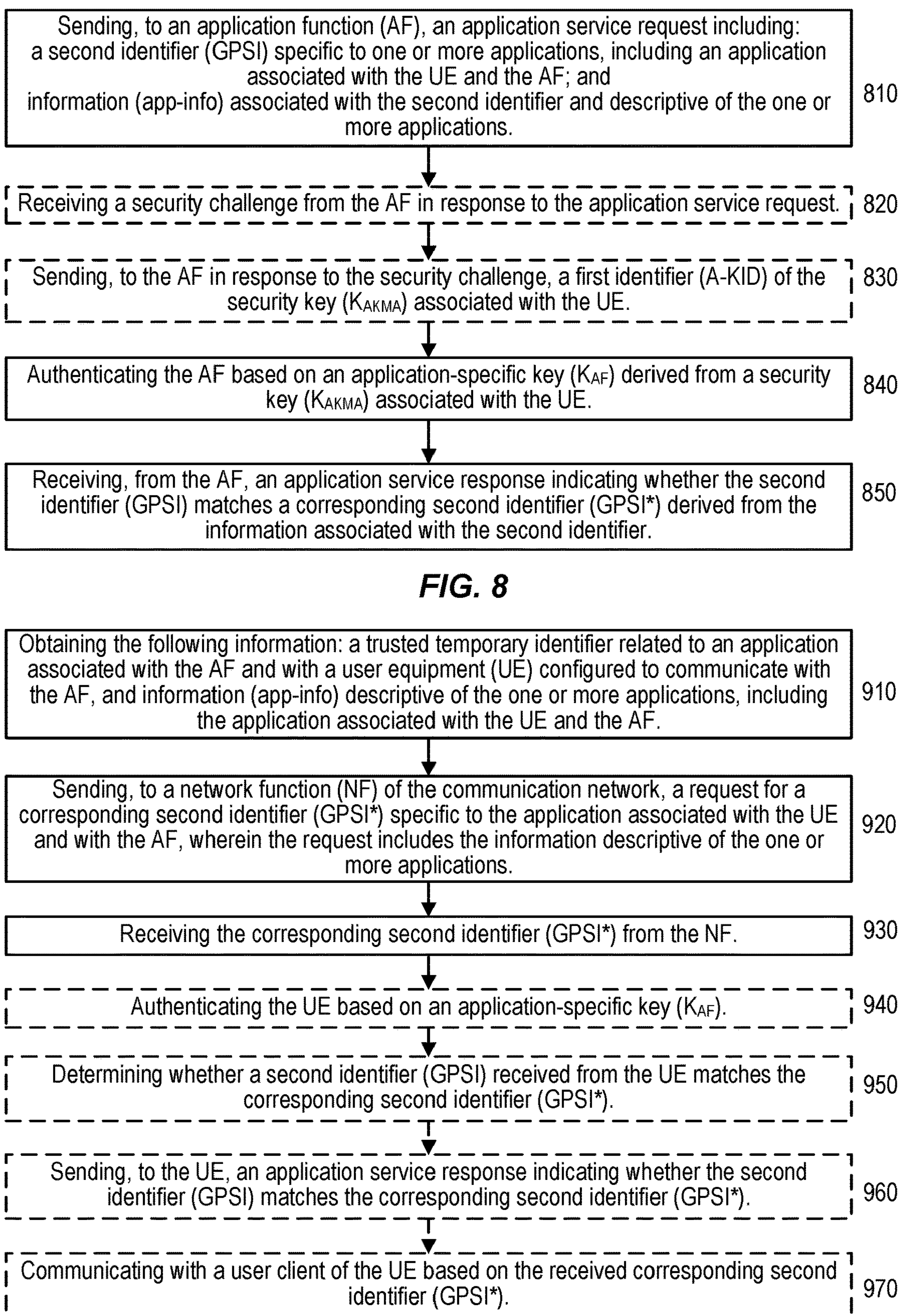
FIG. 8 illustrates an exemplary method (e.g., procedure) for a UE, according to various exemplary embodiments of the present disclosure.
FIG. 9 illustrates an exemplary method (e.g., procedure) for an AF associated with a communication network, according to various exemplary embodiments of the present disclosure.

In particular, FIG. 8 illustrates an exemplary method (e.g., procedure) for a UE configured to communicate with an AF via a communication network, according to various exemplary embodiments of the present disclosure. The exemplary method shown in FIG. 8 can be performed by any appropriate type of UE, such as those described herein with reference to other figures.

The exemplary method can include the operations of block 810, where the UE can send, to the AF, an application service request including a second identifier (GPSI) specific to one or more applications, including an application associated with the UE and the AF, as well as information (app-info) associated with the second identifier and descriptive of the one or more applications. The exemplary method can also include the operations of block 840, where the UE can authenticate the AF based on an application-specific key ($K_{AF}$) derived from a security key ($K_{AKMA}$) associated with the UE. The exemplary method can also include the operations of block 850, where the UE can receive, from the AF, an application service response indicating whether the second identifier (GPSI) matches a corresponding second identifier (GPSI*) derived from the information associated with the second identifier.

In some embodiments, the application service request also includes a first identifier (A-KID) of the security key ($K_{AKMA}$) associated with the UE. An example of such embodiments is shown in FIG. 6. In other embodiments, the exemplary method can also include the operations of blocks 820-830, where the UE can receive a security challenge from the AF in response to the application service request and send, to the AF in response to the security challenge, a first identifier (A-KID) of the security key ($K_{AKMA}$) associated with the UE.

In some embodiments, the AF comprises one or more of the following servers in an Edge Data Network (EDN) coupled to the communication network: Edge Enabler Server (EES), Edge Application Server (EAS), Edge Configuration Server (ECS). In such embodiments, the method can be performed by a user client, of the UE, that is configured to communicate with the one or more servers comprising the AF.

In addition, FIG. 9 illustrates an exemplary method (e.g., procedure) for an application function (AF) associated with a communication network, according to various exemplary embodiments of the present disclosure. The exemplary method shown in FIG. 9 can be performed by any appropriate type of AF, such as those described herein with reference to other figures.

The exemplary method can include the operations of block 910, where the AF can obtain the following information:

- a trusted temporary identifier related to an application associated with the AF and with a user equipment (UE) configured to communicate with the AF, and
- information (app-info) descriptive of the one or more applications, including the application associated with the UE and the AF;

The exemplary method can also include the operations of block 920, where the AF can send, to a network function (NF) of the communication network, a request for a corresponding second identifier (GPSI*) specific to the application associated with the UE and with the AF. The request includes the information descriptive of the one or more applications. The exemplary method can also include the operations of block 930, where the AF can receive the corresponding second identifier from the NF.

In some embodiments, the trusted temporary identifier is a second identifier (GPSI) specific to one or more applications, including the application associated with the UE and the AF. In such embodiments, the trusted temporary identifier is received in an application service request from the UE. An example of these embodiments is shown in FIG. 6.

In some of these embodiments, the information descriptive of the one or more applications can also be received in the application service request, or the information descriptive of the one or more applications can be determined based on the trusted temporary identifier (e.g., GPSI) received in the application service request.

In some of these embodiments, the request for the corresponding second identifier comprises an AKMA request message that also includes a first identifier (A-KID) of a security key ($K_{AKMA}$) associated with the UE. In such embodiments, the corresponding second identifier (GPSI*) is received from the NF, in response to the AKMA request message, together with an application-specific key ($K_{AF}$) associated with the UE and the AF.

In some of these embodiments the exemplary method can also include the operations of blocks 940-960. In block 940, the AF can authenticate the UE based on the application-specific key ($K_{AF}$). In block 950, the AF can determine whether the second identifier (GPSI) received in the application service request from the UE matches the corresponding second identifier (GPSI*) received from the NF. In block 960, the AF can send, to the UE, an application service response indicating whether the second identifier (GPSI) matches the corresponding second identifier (GPSI*).

In other embodiments, the trusted temporary identifier is a UE Internet Protocol (IP) address for a connection between the UE and the AF and is obtained by a connection layer or a network layer of the AF. An example of these embodiments is shown in FIG. 7. In some of these embodiments, the information descriptive of the one or more applications can be received from the UE via the connection or can be determined based on local policy associated with the AF.

In some embodiments, the AF comprises one or more of the following servers in an Edge Data Network (EDN) coupled to the communication network: Edge Enabler Server (EES), Edge Application Server (EAS), Edge Configuration Server (ECS). In such embodiments, the one or more servers comprising the AF are configured to communicate with a user client of the UE.

Figures 10, 11:
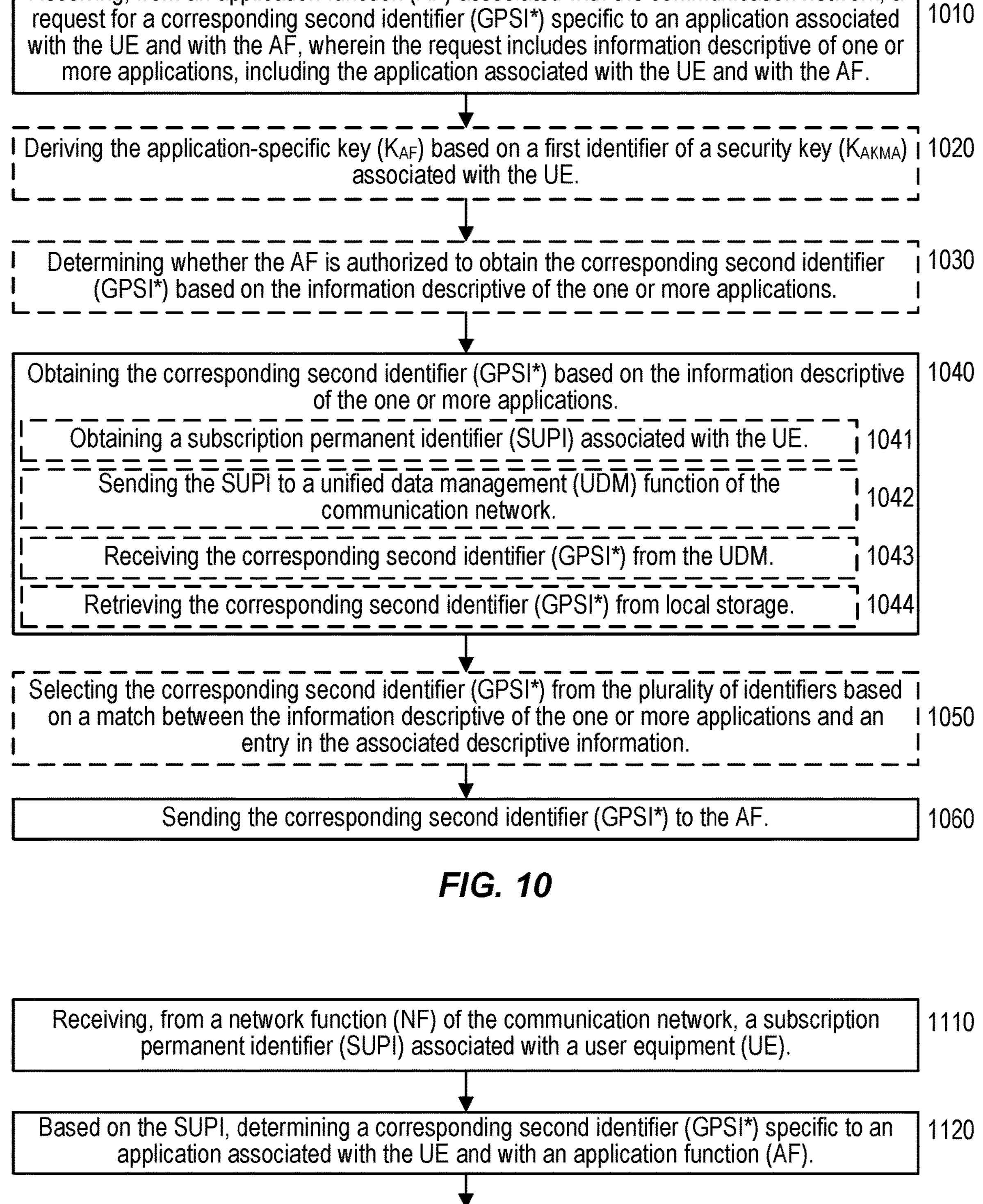
FIG. 10 illustrates an exemplary method (e.g., procedure) for a network function (NF) of a communication network, according to various exemplary embodiments of the present disclosure.
FIG. 11 illustrates an exemplary method (e.g., procedure) for a unified data management (UDM) function of a communication network, according to various exemplary embodiments of the present disclosure.

In addition, FIG. 10 illustrates an exemplary method (e.g., procedure) for a network function (NF) of a communication network, according to various exemplary embodiments of the present disclosure. The exemplary method shown in FIG. 10 can be performed by an NEF or an AAnF such as described herein with reference to other figures. In the following description of FIG. 10, the more-generic "NF" is used to mean an NEF or an AAnF, unless expressly stated otherwise.

The exemplary method can include the operations of block 1010, where the NF can receive, from an application function (AF) associated with the communication network, a request for a corresponding second identifier (GPSI*) specific to an application associated with the UE and with the AF. The request includes information descriptive of one or more applications, including the application associated with the UE and with the AF. The exemplary method can also include the operations of block 1040, where the NF can obtain the corresponding second identifier (GPSI*) based on the information descriptive of the one or more applications. The exemplary method can also include the operations of block 1060, where the NF can send the corresponding second identifier (GPSI*) to the AF.

In some embodiments, obtaining the corresponding second identifier (GPSI*) in block 1040 can include the operations of sub-blocks 1041-1043, where the NF can obtain a subscription permanent identifier (SUPI) associated with the UE; send the SUPI to a unified data management (UDM) function of the communication network; and receive the corresponding second identifier (GPSI*) from the UDM.

In some of these embodiments, the SUPI is sent to the UDM together with the information descriptive of the one or more applications. In other of these embodiments (i.e., when the descriptive information is not sent to UDM), the corresponding second identifier (GPSI*) is one of a plurality of identifiers received from the UDM together with associated descriptive information (e.g., associated with respective ones of the identifiers). In such embodiments, the exemplary method can also include the operations of block 1050, where the NF can select the corresponding second identifier (GPSI*) from the plurality of identifiers based on a match between the information descriptive of the one or more applications and an entry in the associated descriptive information.

In other embodiments, obtaining the corresponding second identifier (GPSI*) in block 1040 can include the operations of sub-block 1044, where the NF can retrieve the corresponding second identifier (GPSI*) from local storage.

In some embodiments, the request for the corresponding second identifier comprises an AKMA request message that also includes a first identifier (A-KID) of a security key ($K_{AKMA}$) associated with the UE. An example of these embodiments is shown in FIG. 6. In such embodiments, the exemplary method can also include the operations of blocks 1020-1030, where the NF can derive the application-specific key ($K_{AF}$) based on the first identifier and determine whether the AF is authorized to obtain the corresponding second identifier (GPSI*) based on the information descriptive of the one or more applications. In some of these embodiments, the corresponding second identifier (GPSI*) is sent to the AF in an AKMA response message together with an application-specific key ($K_{AF}$) associated with the UE and the AF, based on a determination that the AF is authorized.

In other embodiments, the request for the corresponding second identifier comprises a translation request that also includes a UE Internet Protocol (IP) address for a connection between the UE and the AF. In such embodiments, the subscription permanent identifier (SUPI) is obtained (e.g., in sub-block 1041) based on the UE IP address. An example of these embodiments is shown in FIG. 7.

In some embodiments, the NF is a network exposure function (NF) or an anchor function for authentication and key management for applications (AAnF), and the AF comprises one or more of the following servers in an Edge Data Network (EDN) coupled to the communication network: EES, EAS, and ECS.

In addition, FIG. 11 illustrates an exemplary method (e.g., procedure) for a UDM of a communication network, according to various exemplary embodiments of the present disclosure. The exemplary method shown in FIG. 11 can be performed by an UDM such as described herein with reference to other figures.

The exemplary method can include the operations of block 1110, where the UDM can receive, from a network function (NF) of the communication network, a subscription permanent identifier (SUPI) associated with a user equipment (UE). The exemplary method can also include the operations of block 1120, where the UDM can, based on the SUPI, determine a corresponding second identifier (GPSI*) specific to an application associated with the UE and with an application function (AF). The exemplary method can also include the operations of block 1130, where the UDM can send the corresponding second identifier (GPSI*) to the NF.

In some embodiments, determining the corresponding second identifier (GPSI*) in block 1120 is further based on information descriptive of one or more applications, including the application associated with the UE and with the AF. In such case, the information descriptive of the one or more applications is received from the NF (e.g., in block 1110) together with the SUPI.

In other embodiments, the corresponding second identifier (GPSI*) is one of a plurality of identifiers determined based on the SUPI (e.g., in block 1120) and the plurality of identifiers are sent to the NF (e.g., in block 1130) together with associated information descriptive of applications.

In some embodiments, the NF is a network exposure function (NF) or an anchor function for authentication and key management for applications (AAnF).

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 12:
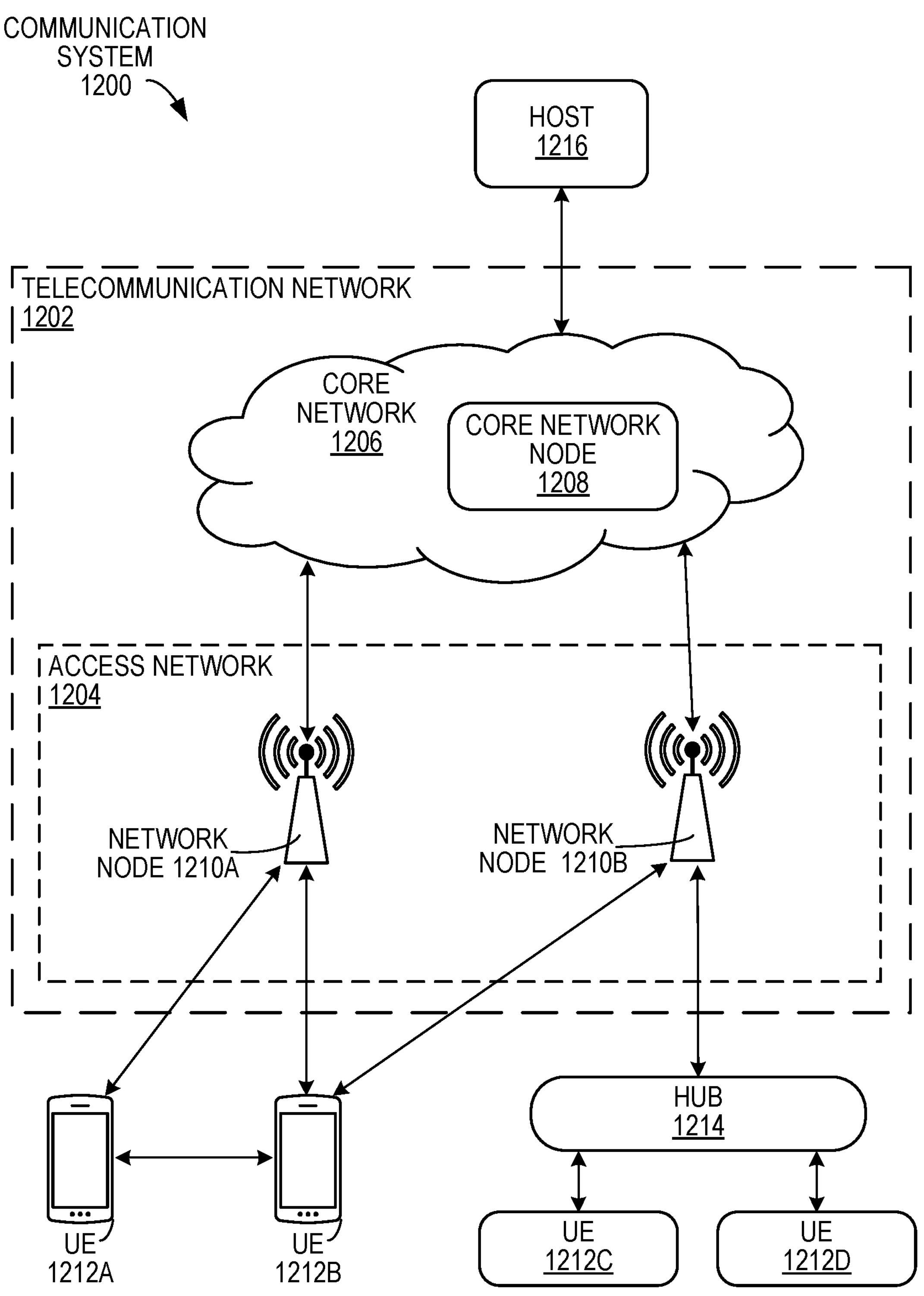
FIG. 12 shows a communication system according to various exemplary embodiments of the present disclosure.

FIG. 12 shows an example of a communication system 1200 in accordance with some embodiments. In the example, the communication system 1200 includes a telecommunication network 1202 that includes an access network 1204, such as a radio access network (RAN), and a core network 1206, which includes one or more core network nodes 1208. The access network 1204 includes one or more access network nodes, such as network nodes 1210*a* and 1210*b* (one or more of which may be generally referred to as network nodes 1210), or any other similar 3rd Generation Partnership Project (3GPP) access node or non-3GPP access point. The network nodes 1210 facilitate direct or indirect connection of user equipment (UE), such as by connecting UEs 1212*a*, 1212*b*, 1212*c*, and 1212*d* (one or more of which may be generally referred to as UEs 1212) to the core network 1206 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1200 may include any number of wired or wireless networks, network nodes, UEs, and/or any other components or systems that may facilitate or participate in the communication of data and/or signals whether via wired or wireless connections. The communication system 1200 may include and/or interface with any type of communication, telecommunication, data, cellular, radio network, and/or other similar type of system.

The UEs 1212 may be any of a wide variety of communication devices, including wireless devices arranged, configured, and/or operable to communicate wirelessly with the network nodes 1210 and other communication devices. Similarly, the network nodes 1210 are arranged, capable, configured, and/or operable to communicate directly or indirectly with the UEs 1212 and/or with other network nodes or equipment in the telecommunication network 1202 to enable and/or provide network access, such as wireless network access, and/or to perform other functions, such as administration in the telecommunication network 1202.

In the depicted example, the core network 1206 connects the network nodes 1210 to one or more hosts, such as host 1216. These connections may be direct or indirect via one or more intermediary networks or devices. In other examples, network nodes may be directly coupled to hosts. The core network 1206 includes one more core network nodes (e.g., core network node 1208) that are structured with hardware and software components. Features of these components may be substantially similar to those described with respect to the UEs, network nodes, and/or hosts, such that the descriptions thereof are generally applicable to the corresponding components of the core network node 1208. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1216 may be under the ownership or control of a service provider other than an operator or provider of the access network 1204 and/or the telecommunication network 1202, and may be operated by the service provider or on behalf of the service provider. The host 1216 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1200 of FIG. 12 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1202 is a cellular network that implements 3GPP standardized features. Accordingly, the telecommunications network 1202 may support network slicing to provide different logical networks to different devices that are connected to the telecommunication network 1202. For example, the telecommunications network 1202 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1212 are configured to transmit and/or receive information without direct human interaction. For instance, a UE may be designed to transmit information to the access network 1204 on a predetermined schedule, when triggered by an internal or external event, or in response to requests from the access network 1204. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1214 communicates with the access network 1204 to facilitate indirect communication between one or more UEs (e.g., UE 1212*c* and/or 1212*d*) and network nodes (e.g., network node 1210*b*). In some examples, the hub 1214 may be a controller, router, content source and analytics, or any of the other communication devices described herein regarding UEs. For example, the hub 1214 may be a broadband router enabling access to the core network 1206 for the UEs. As another example, the hub 1214 may be a controller that sends commands or instructions to one or more actuators in the UEs. Commands or instructions may be received from the UEs, network nodes 1210, or by executable code, script, process, or other instructions in the hub 1214. As another example, the hub 1214 may be a data collector that acts as temporary storage for UE data and, in some embodiments, may perform analysis or other processing of the data. As another example, the hub 1214 may be a content source. For example, for a UE that is a VR headset, display, loudspeaker or other media delivery device, the hub 1214 may retrieve VR assets, video, audio, or other media or data related to sensory information via a network node, which the hub 1214 then provides to the UE either directly, after performing local processing, and/or after adding additional local content. In still another example, the hub 1214 acts as a proxy server or orchestrator for the UEs, in particular in if one or more of the UEs are low energy IoT devices.

The hub 1214 may have a constant/persistent or intermittent connection to the network node 1210*b*. The hub 1214 may also allow for a different communication scheme and/or schedule between the hub 1214 and UEs (e.g., UE 1212*c* and/or 1212*d*), and between the hub 1214 and the core network 1206. In other examples, the hub 1214 is connected to the core network 1206 and/or one or more UEs via a wired connection. Moreover, the hub 1214 may be configured to connect to an M2M service provider over the access network 1204 and/or to another UE over a direct connection. In some scenarios, UEs may establish a wireless connection with the network nodes 1210 while still connected via the hub 1214 via a wired or wireless connection. In some embodiments, the hub 1214 may be a dedicated hub—that is, a hub whose primary function is to route communications to/from the UEs from/to the network node 1210*b*. In other embodiments, the hub 1214 may be a non-dedicated hub—that is, a device which is capable of operating to route communications between the UEs and network node 1210*b*, but which is additionally capable of operating as a communication start and/or end point for certain data channels.

Figure 13:
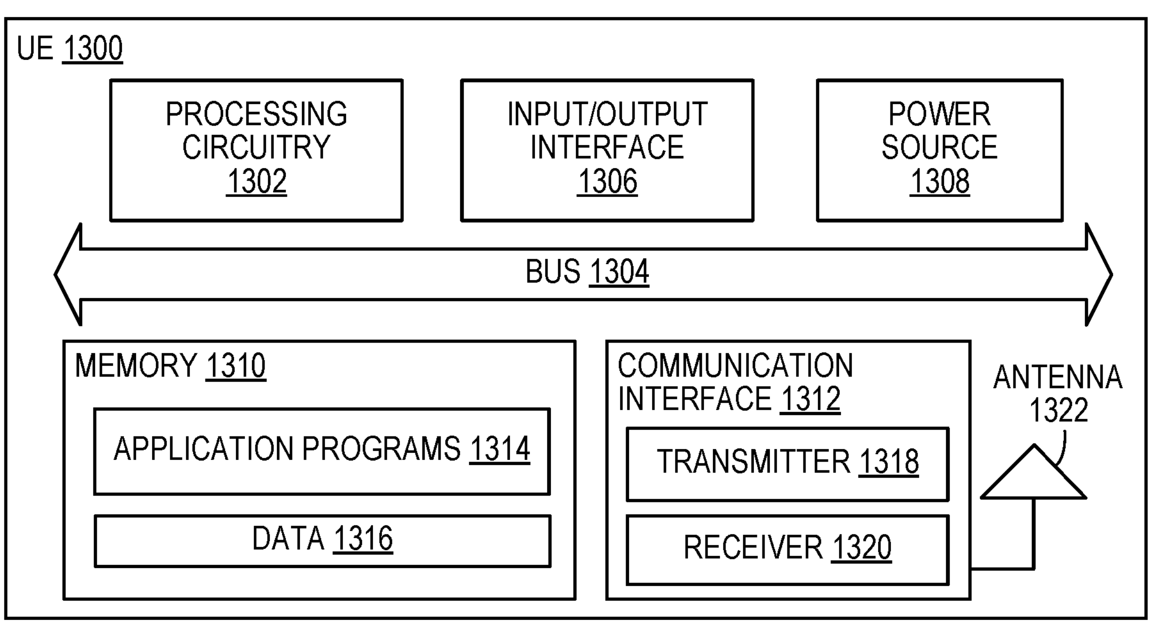
FIG. 13 shows a UE according to various exemplary embodiments of the present disclosure.

FIG. 13 shows a UE 1300 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1300 includes processing circuitry 1302 that is operatively coupled via a bus 1304 to an input/output interface 1306, a power source 1308, a memory 1310, a communication interface 1312, and/or any other component, or any combination thereof. Certain UEs may utilize all or a subset of the components shown in FIG. 13. The level of integration between the components may vary from one UE to another UE. Further, certain UEs may contain multiple instances of a component, such as multiple processors, memories, transceivers, transmitters, receivers, etc.

The processing circuitry 1302 is configured to process instructions and data and may be configured to implement any sequential state machine operative to execute instructions stored as machine-readable computer programs in the memory 1310. The processing circuitry 1302 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1302 may include multiple central processing units (CPUs).

In the example, the input/output interface 1306 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1300. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1308 is structured as a battery or battery pack. Other types of power sources, such as an external power source (e.g., an electricity outlet), photovoltaic device, or power cell, may be used. The power source 1308 may further include power circuitry for delivering power from the power source 1308 itself, and/or an external power source, to the various parts of the UE 1300 via input circuitry or an interface such as an electrical power cable. Delivering power may be, for example, for charging of the power source 1308. Power circuitry may perform any formatting, converting, or other modification to the power from the power source 1308 to make the power suitable for the respective components of the UE 1300 to which power is supplied.

The memory 1310 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1310 includes one or more application programs 1314, such as an operating system, web browser application, a widget, gadget engine, or other application, and corresponding data 1316. The memory 1310 may store, for use by the UE 1300, any of a variety of various operating systems or combinations of operating systems.

The memory 1310 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1310 may allow the UE 1300 to access instructions, application programs and the like, stored on transitory or non-transitory memory media, to off-load data, or to upload data. An article of manufacture, such as one utilizing a communication system may be tangibly embodied as or in the memory 1310, which may be or comprise a device-readable storage medium.

The processing circuitry 1302 may be configured to communicate with an access network or other network using the communication interface 1312. The communication interface 1312 may comprise one or more communication subsystems and may include or be communicatively coupled to an antenna 1322. The communication interface 1312 may include one or more transceivers used to communicate, such as by communicating with one or more remote transceivers of another device capable of wireless communication (e.g., another UE or a network node in an access network). Each transceiver may include a transmitter 1318 and/or a receiver 1320 appropriate to provide network communications (e.g., optical, electrical, frequency allocations, and so forth). Moreover, the transmitter 1318 and receiver 1320 may be coupled to one or more antennas (e.g., antenna 1322) and may share circuit components, software or firmware, or alternatively be implemented separately.

In the illustrated embodiment, communication functions of the communication interface 1312 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1312, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1300 shown in FIG. 13.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 14:
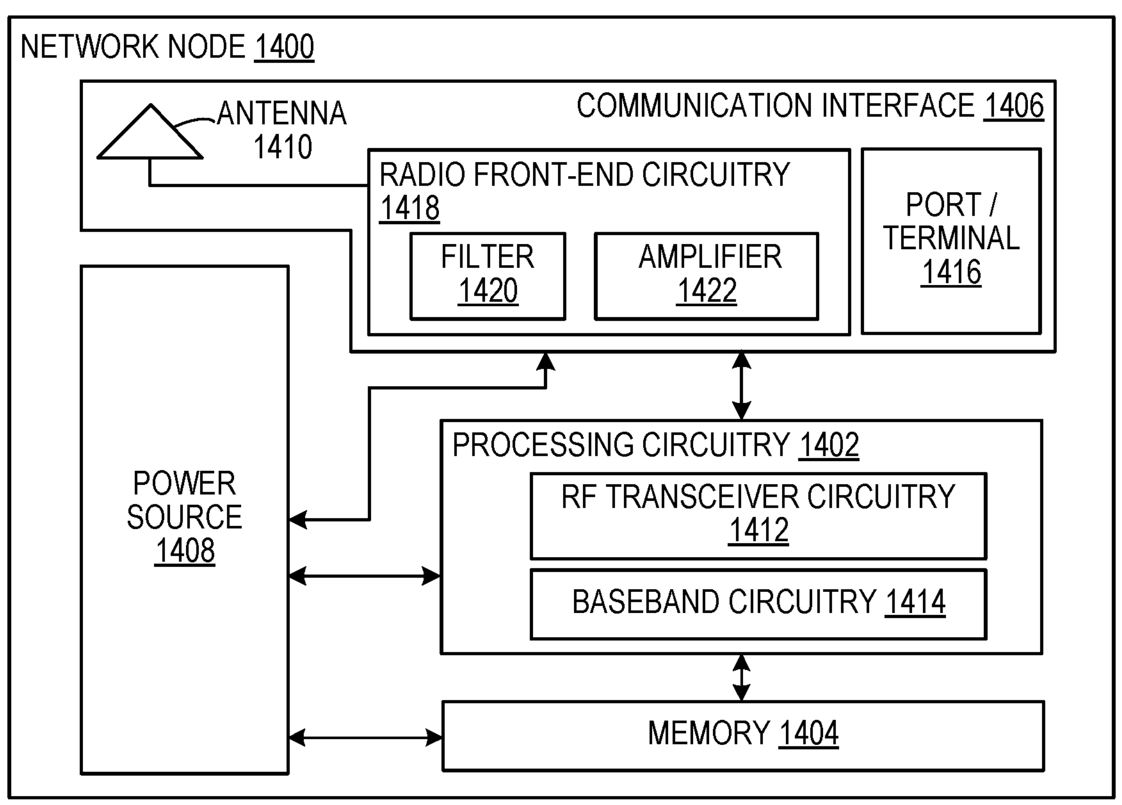
FIG. 14 shows a network node according to various exemplary embodiments of the present disclosure.

FIG. 14 shows a network node 1400 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1400 includes a processing circuitry 1402, a memory 1404, a communication interface 1406, and a power source 1408. The network node 1400 may be composed of multiple physically separate components (e.g., a NodeB component and a RNC component, or a BTS component and a BSC component, etc.), which may each have their own respective components. In certain scenarios in which the network node 1400 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1400 may be configured to support multiple radio access technologies (RATs). In such embodiments, some components may be duplicated (e.g., separate memory 1404 for different RATs) and some components may be reused (e.g., a same antenna 1410 may be shared by different RATs). The network node 1400 may also include multiple sets of the various illustrated components for different wireless technologies integrated into network node 1400, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1400.

The processing circuitry 1402 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1400 components, such as the memory 1404, to provide network node 1400 functionality.

In some embodiments, the processing circuitry 1402 includes a system on a chip (SOC). In some embodiments, the processing circuitry 1402 includes one or more of radio frequency (RF) transceiver circuitry 1412 and baseband processing circuitry 1414. In some embodiments, the radio frequency (RF) transceiver circuitry 1412 and the baseband processing circuitry 1414 may be on separate chips (or sets of chips), boards, or units, such as radio units and digital units. In alternative embodiments, part or all of RF transceiver circuitry 1412 and baseband processing circuitry 1414 may be on the same chip or set of chips, boards, or units.

The memory 1404 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1402. The memory 1404 may store any suitable instructions, data, or information, including a computer program, software, an application including one or more of logic, rules, code, tables, and/or other instructions capable of being executed by the processing circuitry 1402 and utilized by the network node 1400. The memory 1404 may be used to store any calculations made by the processing circuitry 1402 and/or any data received via the communication interface 1406. In some embodiments, the processing circuitry 1402 and memory 1404 is integrated.

The communication interface 1406 is used in wired or wireless communication of signaling and/or data between a network node, access network, and/or UE. As illustrated, the communication interface 1406 comprises port(s)/terminal(s) 1416 to send and receive data, for example to and from a network over a wired connection. The communication interface 1406 also includes radio front-end circuitry 1418 that may be coupled to, or in certain embodiments a part of, the antenna 1410. Radio front-end circuitry 1418 comprises filters 1420 and amplifiers 1422. The radio front-end circuitry 1418 may be connected to an antenna 1410 and processing circuitry 1402. The radio front-end circuitry may be configured to condition signals communicated between antenna 1410 and processing circuitry 1402. The radio front-end circuitry 1418 may receive digital data that is to be sent out to other network nodes or UEs via a wireless connection. The radio front-end circuitry 1418 may convert the digital data into a radio signal having the appropriate channel and bandwidth parameters using a combination of filters 1420 and/or amplifiers 1422. The radio signal may then be transmitted via the antenna 1410. Similarly, when receiving data, the antenna 1410 may collect radio signals which are then converted into digital data by the radio front-end circuitry 1418. The digital data may be passed to the processing circuitry 1402. In other embodiments, the communication interface may comprise different components and/or different combinations of components.

In certain alternative embodiments, the network node 1400 does not include separate radio front-end circuitry 1418, instead, the processing circuitry 1402 includes radio front-end circuitry and is connected to the antenna 1410. Similarly, in some embodiments, all or some of the RF transceiver circuitry 1412 is part of the communication interface 1406. In still other embodiments, the communication interface 1406 includes one or more ports or terminals 1416, the radio front-end circuitry 1418, and the RF transceiver circuitry 1412, as part of a radio unit (not shown), and the communication interface 1406 communicates with the baseband processing circuitry 1414, which is part of a digital unit (not shown).

The antenna 1410 may include one or more antennas, or antenna arrays, configured to send and/or receive wireless signals. The antenna 1410 may be coupled to the radio front-end circuitry 1418 and may be any type of antenna capable of transmitting and receiving data and/or signals wirelessly. In certain embodiments, the antenna 1410 is separate from the network node 1400 and connectable to the network node 1400 through an interface or port.

The antenna 1410, communication interface 1406, and/or the processing circuitry 1402 may be configured to perform any receiving operations and/or certain obtaining operations described herein as being performed by the network node. Any information, data and/or signals may be received from a UE, another network node and/or any other network equipment. Similarly, the antenna 1410, the communication interface 1406, and/or the processing circuitry 1402 may be configured to perform any transmitting operations described herein as being performed by the network node. Any information, data and/or signals may be transmitted to a UE, another network node and/or any other network equipment.

The power source 1408 provides power to the various components of network node 1400 in a form suitable for the respective components (e.g., at a voltage and current level needed for each respective component). The power source 1408 may further comprise, or be coupled to, power management circuitry to supply the components of the network node 1400 with power for performing the functionality described herein. For example, the network node 1400 may be connectable to an external power source (e.g., the power grid, an electricity outlet) via an input circuitry or interface such as an electrical cable, whereby the external power source supplies power to power circuitry of the power source 1408. As a further example, the power source 1408 may comprise a source of power in the form of a battery or battery pack which is connected to, or integrated in, power circuitry. The battery may provide backup power should the external power source fail.

Embodiments of the network node 1400 may include additional components beyond those shown in FIG. 14 for providing certain aspects of the network node's functionality, including any of the functionality described herein and/or any functionality necessary to support the subject matter described herein. For example, the network node 1400 may include user interface equipment to allow input of information into the network node 1400 and to allow output of information from the network node 1400. This may allow a user to perform diagnostic, maintenance, repair, and other administrative functions for the network node 1400.

Figure 15:
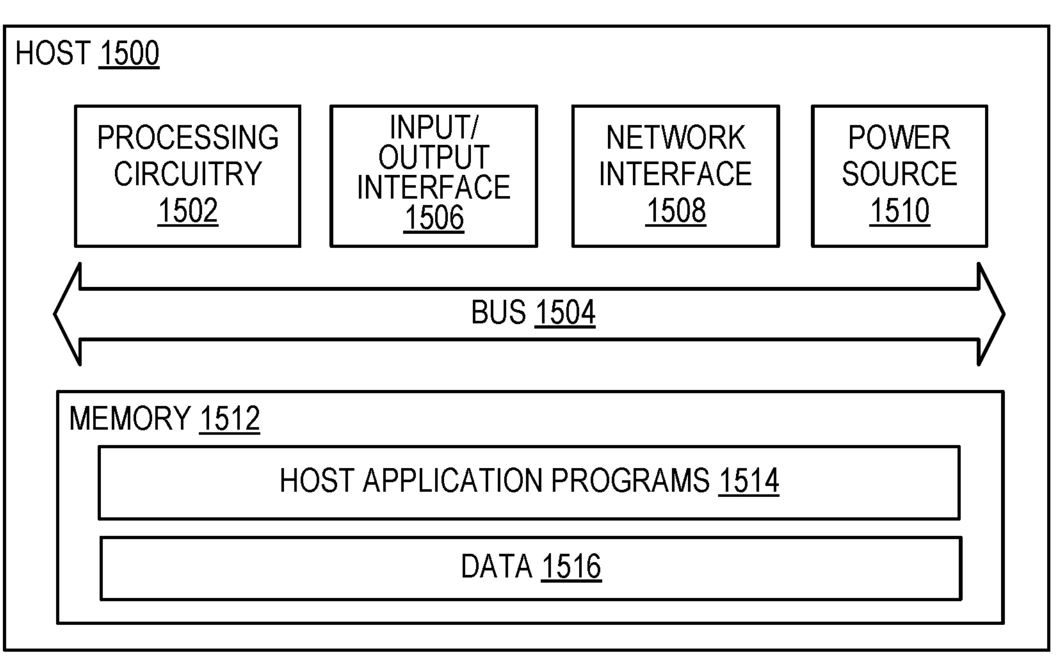
FIG. 15 shows host computing system according to various exemplary embodiments of the present disclosure.

FIG. 15 is a block diagram of a host 1500, which may be an embodiment of the host 1216 of FIG. 12, in accordance with various aspects described herein. As used herein, the host 1500 may be or comprise various combinations hardware and/or software, including a standalone server, a blade server, a cloud-implemented server, a distributed server, a virtual machine, container, or processing resources in a server farm. The host 1500 may provide one or more services to one or more UEs.

The host 1500 includes processing circuitry 1502 that is operatively coupled via a bus 1504 to an input/output interface 1506, a network interface 1508, a power source 1510, and a memory 1512. Other components may be included in other embodiments. Features of these components may be substantially similar to those described with respect to the devices of previous figures, such as FIGS. 13 and 14, such that the descriptions thereof are generally applicable to the corresponding components of host 1500.

The memory 1512 may include one or more computer programs including one or more host application programs 1514 and data 1516, which may include user data, e.g., data generated by a UE for the host 1500 or data generated by the host 1500 for a UE. Embodiments of the host 1500 may utilize only a subset or all of the components shown. The host application programs 1514 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1514 may also provide for user authentication and licensing checks and may periodically report health, routes, and content availability to a central node, such as a device in or on the edge of a core network. Accordingly, the host 1500 may select and/or indicate a different host for over-the-top services for a UE. The host application programs 1514 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 16:
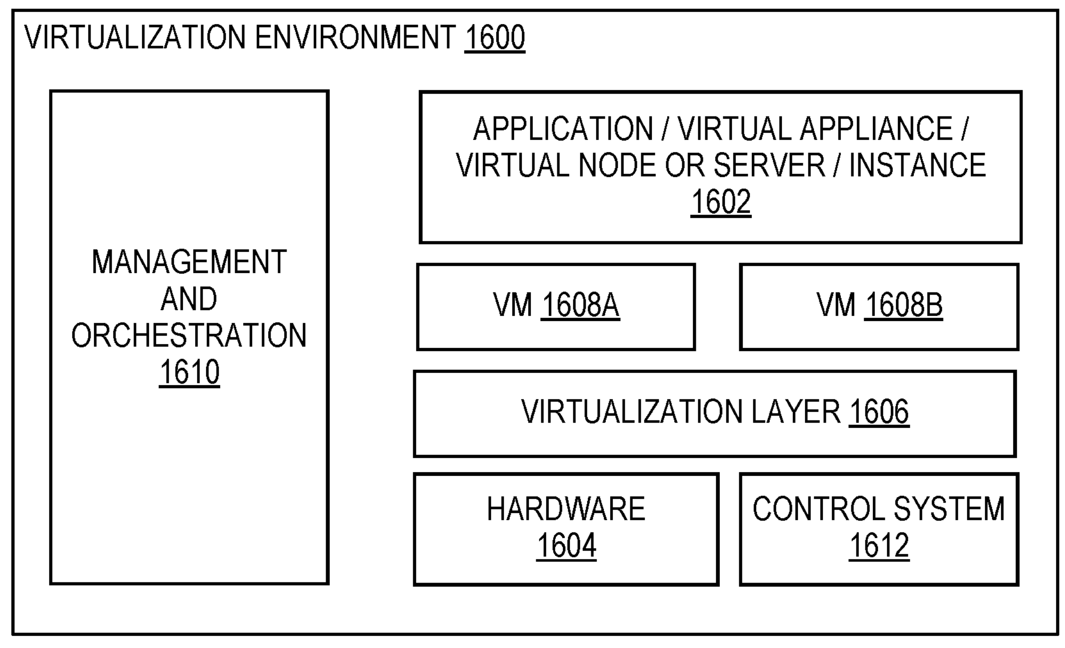
FIG. 16 is a block diagram of a virtualization environment in functions implemented by some embodiments of the present disclosure may be virtualized.

FIG. 16 is a block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1600 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1602 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1604 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1606 (also referred to as hypervisors or virtual machine monitors (VMMs)), provide VMs 1608*a* and 1608*b* (one or more of which may be generally referred to as VMs 1608), and/or perform any of the functions, features and/or benefits described in relation with some embodiments described herein. The virtualization layer 1606 may present a virtual operating platform that appears like networking hardware to the VMs 1608.

The VMs 1608 comprise virtual processing, virtual memory, virtual networking or interface and virtual storage, and may be run by a corresponding virtualization layer 1606. Different embodiments of the instance of a virtual appliance 1602 may be implemented on one or more of VMs 1608, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1608 may be a software implementation of a physical machine that runs programs as if they were executing on a physical, non-virtualized machine. Each of the VMs 1608, and that part of hardware 1604 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1608 on top of the hardware 1604 and corresponds to the application 1602.

Hardware 1604 may be implemented in a standalone network node with generic or specific components. Hardware 1604 may implement some functions via virtualization. Alternatively, hardware 1604 may be part of a larger cluster of hardware (e.g., such as in a data center or CPE) where many hardware nodes work together and are managed via management and orchestration 1610, which, among others, oversees lifecycle management of applications 1602. In some embodiments, hardware 1604 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1612 which may alternatively be used for communication between hardware nodes and radio units.

Figure 17:
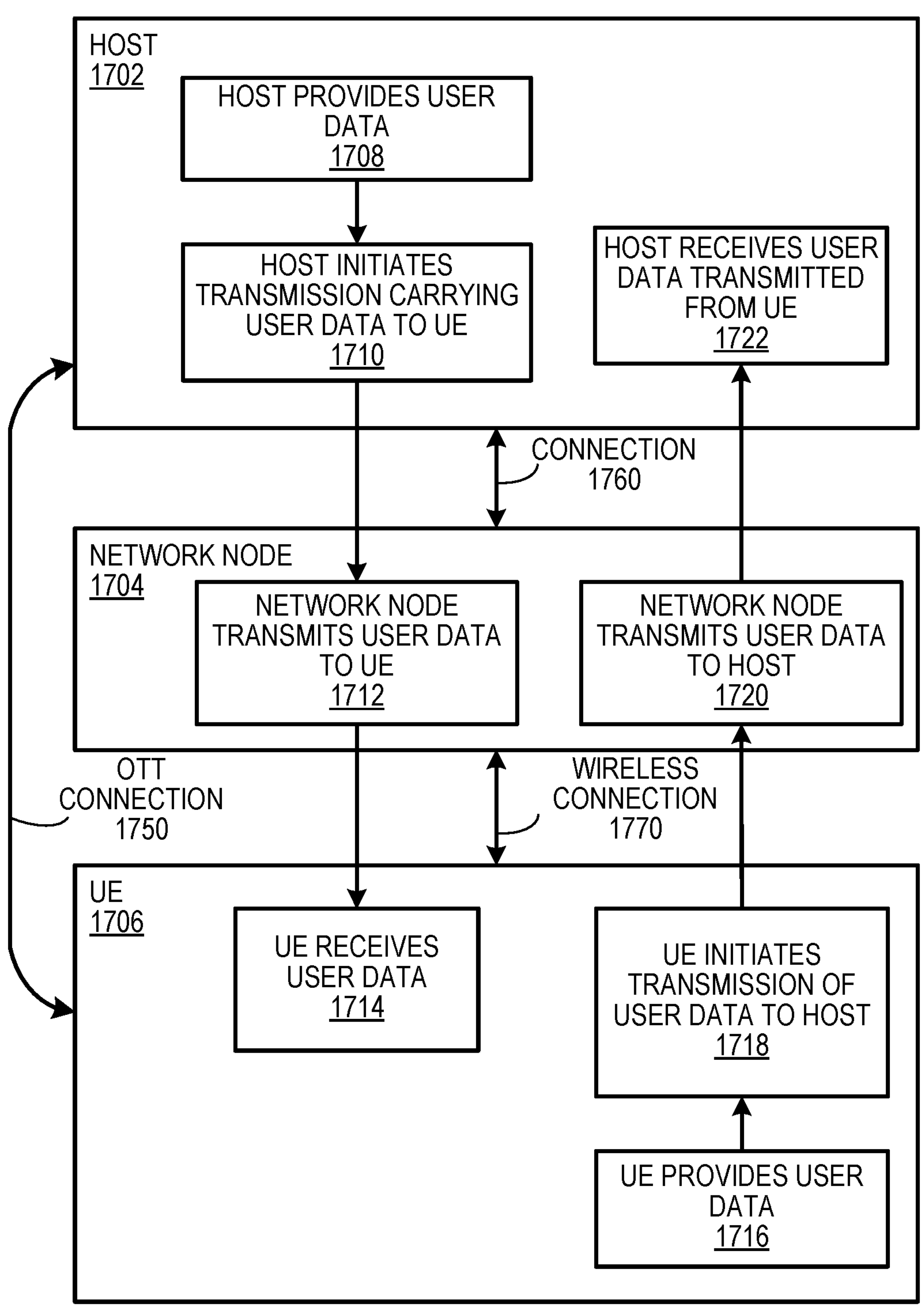
FIG. 17 illustrates communication between a host computing system, a network node, and a UE via multiple connections, at least one of which is wireless, according to various exemplary embodiments of the present disclosure.

FIG. 17 shows a communication diagram of a host 1702 communicating via a network node 1704 with a UE 1706 over a partially wireless connection in accordance with some embodiments. Example implementations, in accordance with various embodiments, of the UE (such as a UE 1212*a* of FIG. 12 and/or UE 1300 of FIG. 13), network node (such as network node 1210*a* of FIG. 12 and/or network node 1400 of FIG. 14), and host (such as host 1216 of FIG. 12 and/or host 1500 of FIG. 15) discussed in the preceding paragraphs will now be described with reference to FIG. 17.

Like host 1500, embodiments of host 1702 include hardware, such as a communication interface, processing circuitry, and memory. The host 1702 also includes software, which is stored in or accessible by the host 1702 and executable by the processing circuitry. The software includes a host application that may be operable to provide a service to a remote user, such as the UE 1706 connecting via an over-the-top (OTT) connection 1750 extending between the UE 1706 and host 1702. In providing the service to the remote user, a host application may provide user data which is transmitted using the OTT connection 1750.

The network node 1704 includes hardware enabling it to communicate with the host 1702 and UE 1706. The connection 1760 may be direct or pass through a core network (like core network 1206 of FIG. 12) and/or one or more other intermediate networks, such as one or more public, private, or hosted networks. For example, an intermediate network may be a backbone network or the Internet.

The UE 1706 includes hardware and software, which is stored in or accessible by UE 1706 and executable by the UE's processing circuitry. The software includes a client application, such as a web browser or operator-specific "app" that may be operable to provide a service to a human or non-human user via UE 1706 with the support of the host 1702. In the host 1702, an executing host application may communicate with the executing client application via the OTT connection 1750 terminating at the UE 1706 and host 1702. In providing the service to the user, the UE's client application may receive request data from the host's host application and provide user data in response to the request data. The OTT connection 1750 may transfer both the request data and the user data. The UE's client application may interact with the user to generate the user data that it provides to the host application through the OTT connection 1750.

The OTT connection 1750 may extend via a connection 1760 between the host 1702 and the network node 1704 and via a wireless connection 1770 between the network node 1704 and the UE 1706 to provide the connection between the host 1702 and the UE 1706. The connection 1760 and wireless connection 1770, over which the OTT connection 1750 may be provided, have been drawn abstractly to illustrate the communication between the host 1702 and the UE 1706 via the network node 1704, without explicit reference to any intermediary devices and the precise routing of messages via these devices.

As an example of transmitting data via the OTT connection 1750, in step 1708, the host 1702 provides user data, which may be performed by executing a host application. In some embodiments, the user data is associated with a particular human user interacting with the UE 1706. In other embodiments, the user data is associated with a UE 1706 that shares data with the host 1702 without explicit human interaction. In step 1710, the host 1702 initiates a transmission carrying the user data towards the UE 1706. The host 1702 may initiate the transmission responsive to a request transmitted by the UE 1706. The request may be caused by human interaction with the UE 1706 or by operation of the client application executing on the UE 1706. The transmission may pass via the network node 1704, in accordance with the teachings of the embodiments described throughout this disclosure. Accordingly, in step 1712, the network node 1704 transmits to the UE 1706 the user data that was carried in the transmission that the host 1702 initiated, in accordance with the teachings of the embodiments described throughout this disclosure. In step 1714, the UE 1706 receives the user data carried in the transmission, which may be performed by a client application executed on the UE 1706 associated with the host application executed by the host 1702.

In some examples, the UE 1706 executes a client application which provides user data to the host 1702. The user data may be provided in reaction or response to the data received from the host 1702. Accordingly, in step 1716, the UE 1706 may provide user data, which may be performed by executing the client application. In providing the user data, the client application may further consider user input received from the user via an input/output interface of the UE 1706. Regardless of the specific manner in which the user data was provided, the UE 1706 initiates, in step 1718, transmission of the user data towards the host 1702 via the network node 1704. In step 1720, in accordance with the teachings of the embodiments described throughout this disclosure, the network node 1704 receives user data from the UE 1706 and initiates transmission of the received user data towards the host 1702. In step 1722, the host 1702 receives the user data carried in the transmission initiated by the UE 1706.

One or more of the various embodiments described herein can improve the performance of OTT services provided to the UE 1706 using the OTT connection 1750, in which the wireless connection 1770 forms the last segment. For example, embodiments described herein can facilitate use of application-specific GPSIs for authentication, which is consistent with the needs associated with the use of Edge Computing (EC) and/or Edge Data Networks (EDN) to provide OTT services via a 3GPP communication network (e.g., NG-RAN and 5GC). In this manner, embodiments can make such OTT services more secure for users and OTT service providers.

In an example scenario, factory status information may be collected and analyzed by the host 1702. As another example, the host 1702 may process audio and video data which may have been retrieved from a UE for use in creating maps. As another example, the host 1702 may collect and analyze real-time data to assist in controlling vehicle congestion (e.g., controlling traffic lights). As another example, the host 1702 may store surveillance video uploaded by a UE. As another example, the host 1702 may store or control access to media content such as video, audio, VR or AR which it can broadcast, multicast or unicast to UEs. As other examples, the host 1702 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1750 between the host 1702 and UE 1706, in response to variations in the measurement results. The measurement procedure and/or the network functionality for reconfiguring the OTT connection may be implemented in software and hardware of the host 1702 and/or UE 1706. In some embodiments, sensors (not shown) may be deployed in or in association with other devices through which the OTT connection 1750 passes; the sensors may participate in the measurement procedure by supplying values of the monitored quantities exemplified above or by supplying values of other physical quantities from which software may compute or estimate the monitored quantities. The reconfiguring of the OTT connection 1750 may include message format, retransmission settings, preferred routing etc.; the reconfiguring need not directly alter the operation of the network node 1704. Such procedures and functionalities may be known and practiced in the art. In certain embodiments, measurements may involve proprietary UE signaling that facilitates measurements of throughput, propagation times, latency and the like, by the host 1702. The measurements may be implemented in that software causes messages to be transmitted, in particular empty or 'dummy' messages, using the OTT connection 1750 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole, and/or by end users and a wireless network generally.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method for a user equipment (UE) configured to communicate with an application function (AF) via a communication network, the method comprising:

sending, to the AF, an application service request including:

a second identifier (GPSI) of the UE that is specific to one or more applications, including an application associated with the UE and the AF; and information (app-info) associated with the second identifier and descriptive of the one or more applications;

authenticating the AF based on an application-specific key ($K_{AF}$) derived from a security key ($K_{AKMA}$) associated with the UE; and receiving, from the AF, an application service response indicating whether the second identifier (GPSI) matches a corresponding second identifier (GPSI*) of the UE that is derived from the information associated with the second identifier.

2. The method of claim 1, wherein the application service request also includes a first identifier (A-KID) of the security key ($K_{AKMA}$) associated with the UE.

3. The method of claim 1, further comprising:

receiving a security challenge from the AF in response to the application service request; and sending, to the AF in response to the security challenge, a first identifier (A-KID) of the security key ($K_{AKMA}$) associated with the UE.

4. The method of claim 1, wherein:

the AF comprises one or more of the following servers in an Edge Data Network (EDN) coupled to the communication network: Edge Enabler Server (EES), Edge Application Server (EAS), Edge Configuration Server (ECS); and the method is performed by a user client, of the UE, that is configured to communicate with the one or more servers comprising the AF.

5. A method for an application function (AF) associated with a communication network, the method comprising:

receiving, from a user equipment (UE), an application service request including:

a second identifier (GPSI) of the UE that is specific to one or more applications, including an application associated with the UE and the AF; and information (app-info) associated with the second identifier and descriptive of the one or more applications;

sending, to a network function (NF) of the communication network, a request for a corresponding second identifier (GPSI*) of the UE that is specific to the application associated with the UE and with the AF, wherein the request includes the received information descriptive of the one or more applications; and receiving the corresponding second identifier from the NF.

6. The method of claim 5, wherein:

the request for the corresponding second identifier comprises an AKMA request message that also includes a first identifier (A-KID) of a security key ($K_{AKMA}$) associated with the UE; and the corresponding second identifier (GPSI*) is received from the NF, in response to the AKMA request message, together with an application-specific key ($K_{AF}$) associated with the UE and the AF.

7. The method of claim 6, further comprising:

authenticating the UE based on the application-specific key ($K_{AF}$);

determining whether the second identifier (GPSI) received in the application service request from the UE matches the corresponding second identifier (GPSI*) received from the NF; and sending, to the UE, an application service response indicating whether the second identifier (GPSI) matches the corresponding second identifier (GPSI*).

8. The method of claim 5, wherein the application service request also includes a first identifier (A-KID) of a security key ($K_{AKMA}$) associated with the UE.

9. The method of claim 5, further comprising:

sending a security challenge to the UE in response to the application service request; and receiving, from the UE in response to the security challenge, a first identifier (A-KID) of a security key ($K_{AKMA}$) associated with the UE.

10. The method of claim 5, further comprising communicating with a user client of the UE based on the received corresponding second identifier (GPSI*).

11. The method of claim 5, wherein:

the AF comprises one or more of the following servers in an Edge Data Network (EDN) coupled to the communication network: Edge Enabler Server (EES), Edge Application Server (EAS), Edge Configuration Server (ECS); and the one or more servers comprising the AF are configured to communicate with a user client of the UE.

12. A method for a network function (NF) of a communication network, the method comprising:

receiving, from an application function (AF) associated with the communication network, a request for a corresponding second identifier (GPSI*) of a user equipment (UE) that is specific to an application associated with the UE and with the AF, wherein the request includes information (app-info) descriptive of one or more applications, including the application associated with the UE and with the AF, and obtaining the corresponding second identifier (GPSI*) based on the information descriptive of the one or more applications; and sending the corresponding second identifier (GPSI*) to the AF.

13. The method of claim 12, wherein obtaining the corresponding second identifier (GPSI*) comprises the following operations:

obtaining a subscription permanent identifier (SUPI) associated with the UE;

sending the SUPI to a unified data management (UDM) function of the communication network; and receiving the corresponding second identifier (GPSI*) from the UDM.

14. The method of claim 13, wherein the SUPI is sent to the UDM together with the information descriptive of the one or more applications.

15. The method of claim 13, wherein:

the corresponding second identifier (GPSI*) is one of a plurality of identifiers received from the UDM together with associated descriptive information; and the method further comprises selecting the corresponding second identifier (GPSI*) from the plurality of identifiers based on a match between the information descriptive of the one or more applications and an entry in the associated descriptive information.

16. The method of claim 12, wherein obtaining the corresponding second identifier (GPSI*) comprises retrieving the corresponding second identifier (GPSI*) from local storage.

17. The method of claim 12, wherein:

the request for the corresponding second identifier comprises an AKMA request message that also includes a first identifier (A-KID) of a security key ($K_{AKMA}$) associated with the UE; and the method further comprises:

deriving the application-specific key ($K_{AF}$) based on the first identifier, and determining whether the AF is authorized to obtain the corresponding second identifier (GPSI*) based on the information descriptive of the one or more applications.

18. The method of claim 17, wherein the corresponding second identifier (GPSI*) is sent to the AF in an AKMA response message together with an application-specific key ($K_{AF}$) associated with the UE and the AF, based on a determination that the AF is authorized.

19. The method of claim 13, wherein:

the request for the corresponding second identifier comprises a translation request that also includes a UE Internet Protocol (IP) address for a connection between the UE and the AF; and the subscription permanent identifier (SUPI) is obtained based on the UE IP address.

20. The method of claim 12, wherein:

the NF is a network exposure function (NF) or an anchor function for authentication and key management for applications (AAnF); and the AF comprises one or more of the following servers in an Edge Data Network (EDN) coupled to the communication network: Edge Enabler Server (EES), Edge Application Server (EAS), and Edge Configuration Server (ECS).

21. A network function (NF) of a communication network, comprising:

processing circuitry, memory and transceiver circuitry collectively configured to perform operations comprising:

receiving, from an application function (AF) associated with the communication network, a request for a corresponding second identifier (GPSI*) of a user equipment (UE) that is specific to an application associated with the UE and with the AF, wherein the request includes information (app-info) descriptive of one or more applications, including the application associated with the UE and with the AF, and obtaining the corresponding second identifier (GPSI*) based on the information descriptive of the one or more applications; and sending the corresponding second identifier (GPSI*) to the AF.

22. The NF of claim 21, wherein obtaining the corresponding second identifier (GPSI*) comprises the following operations:

obtaining a subscription permanent identifier (SUPI) associated with the UE;

sending the SUPI to a unified data management (UDM) function of the communication network; and receiving the corresponding second identifier (GPSI*) from the UDM.

23. The NF of claim 22, wherein the SUPI is sent to the UDM together with the information descriptive of the one or more applications.

24. The NF of claim 22, wherein:

the corresponding second identifier (GPSI*) is one of a plurality of identifiers received from the UDM together with associated descriptive information; and the method further comprises selecting the corresponding second identifier (GPSI*) from the plurality of identifiers based on a match between the information descriptive of the one or more applications and an entry in the associated descriptive information.

25. The NF of claim 21, wherein obtaining the corresponding second identifier (GPSI*) comprises retrieving the corresponding second identifier (GPSI*) from local storage.

26. The NF of claim 21, wherein:

the request for the corresponding second identifier comprises an AKMA request message that also includes a first identifier (A-KID) of a security key ($K_{AKMA}$) associated with the UE; and the operations further comprise:

deriving the application-specific key ($K_{AF}$) based on the first identifier, and determining whether the AF is authorized to obtain the corresponding second identifier (GPSI*) based on the information descriptive of the one or more applications.

27. The NF of claim 26, wherein the corresponding second identifier (GPSI*) is sent to the AF in an AKMA response message together with an application-specific key ($K_{AF}$) associated with the UE and the AF, based on a determination that the AF is authorized.

28. The NF of claim 22, wherein:

the request for the corresponding second identifier comprises a translation request that also includes a UE Internet Protocol (IP) address for a connection between the UE and the AF; and the subscription permanent identifier (SUPI) is obtained based on the UE IP address.

29. The NF of claim 21, wherein:

the NF is a network exposure function (NF) or an anchor function for authentication and key management for applications (AAnF); and the AF comprises one or more of the following servers in an Edge Data Network (EDN) coupled to the communication network: Edge Enabler Server (EES), Edge Application Server (EAS), and Edge Configuration Server (ECS).

* * * * *